US012562654B2

(12) United States Patent
    Ishizuka

(10) Patent No.: US 12,562,654 B2
(45) Date of Patent: Feb. 24, 2026

(54) POWER CONVERSION DEVICE

(71) Applicant: Mitsubishi Electric Corporation, Tokyo (JP)

(72) Inventor: Mitsuru Ishizuka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 210 days.

(21) Appl. No.: 18/682,122

(22) PCT Filed: Sep. 6, 2021

(86) PCT No.: PCT/JP2021/032633
    § 371 (c)(1),
    (2) Date: Feb. 8, 2024

(87) PCT Pub. No.: WO2023/032194
    PCT Pub. Date: Mar. 9, 2023

(65) Prior Publication Data
    US 2024/0348181 A1    Oct. 17, 2024

(51) Int. Cl.
    *H02M 7/487* (2007.01)
    *H02M 1/36* (2007.01)
    *H02M 7/5387* (2007.01)

(52) U.S. Cl.
    CPC ............. *H02M 7/487* (2013.01); *H02M 1/36* (2013.01); *H02M 7/53871* (2013.01)

(58) Field of Classification Search
    CPC .......................... H02M 7/487; H02M 7/53871
    See application file for complete search history.

(56) References Cited

U.S. PATENT DOCUMENTS

| | | | | |
|---|---|---|---|---|
| 8,750,005 B2 * | 6/2014 | Fujii | ...................... | H02J 3/381 |
| | | | | 363/132 |
| 2012/0092915 A1 * | 4/2012 | Okuda | .................. | H02M 7/487 |
| | | | | 363/132 |
| 2013/0163301 A1 | 6/2013 | Fujii et al. | | |

FOREIGN PATENT DOCUMENTS

| | | |
|---|---|---|
| JP | H11-89240 A | 3/1999 |
| JP | 2013-211999 A | 10/2013 |
| JP | 5386640 B2 | 1/2014 |
| JP | 2017-093039 A | 5/2017 |

OTHER PUBLICATIONS

International Search Report and Written Opinion mailed on Nov. 30, 2021, received for PCT Application PCT/JP2021/032633, filed on Sep. 6, 2021, 8 pages including English Translation.

* cited by examiner

*Primary Examiner* — Gary A Nash
(74) *Attorney, Agent, or Firm* — XSENSUS LLP

(57) ABSTRACT

A controlling circuitry of a power converter has a 3-level operation mode of outputting AC voltage composed of 3-level voltages of a DC circuit by performing ON/OFF control of semiconductor elements, and a 2-level operation mode of outputting AC voltage composed of 2-level voltages of the DC circuit by performing ON/OFF control of the semiconductor elements. The controlling circuitry executes first switchover control for switching between the 2-level operation mode and the 3-level operation mode, at a timing when, among the semiconductor elements, a set semiconductor element according to a polarity of a voltage command for controlling the power converter is continuing to be ON.

20 Claims, 14 Drawing Sheets

PROCESSOR    STORAGE DEVICE 58    59

INPUT    OUTPUT

POWER CONVERSION DEVICE

CROSS-REFERENCE TO RELATED APPLICATION

This application is based on PCT filing PCT/JP2021/032633, filed Sep. 6, 2021, the entire contents of which are incorporated herein by reference.

TECHNICAL FIELD

The present disclosure relates to a power conversion device.

BACKGROUND ART

A power converter which converts DC power to AC power is used for driving an AC electric motor, for example. Such a power converter may have a configuration of performing pulse width modulation (PWM) control in which AC voltage composed of voltages having two different potentials of a DC power supply unit is outputted (hereinafter, referred to as 2-level operation), or may have a configuration of performing PWM control in which AC voltage composed of voltages having three different potentials of a DC power supply unit is outputted (hereinafter, referred to as 3-level operation).

The power converter that performs 3-level operation has a more complicated configuration than the power converter that performs 2-level operation, but has an advantage that harmonic current, ripple current, and the like which adversely influence the device can be reduced. On the other hand, in the power converter that performs 2-level operation, the number of semiconductor elements to which current is applied can be decreased as compared to the power converter that performs 3-level operation, thus having an advantage that conduction loss can be reduced.

Accordingly, in order to perform high-efficiency power conversion utilizing the advantages of the respective power converters that perform 2-level operation and 3-level operation, disclosed is a power conversion device that includes a power converter having a configuration capable of switching between 2-level operation and 3-level operation, and switches between 2-level operation and 3-level operation in accordance with the operation state of the power converter, as shown below.

This conventional power conversion device includes a power converter configured such that, at least two valve devices formed of semiconductor elements are connected in series to form one arm, and an AC switch formed by connecting, in series, at least two valve devices each formed of a semiconductor element and a diode connected in anti-parallel to the semiconductor element is connected between a mutual connection point of the valve devices in each arm and a mutual connection point of a DC power supply, thus enabling 3-level operation or 2-level operation. Then, the power conversion device includes a comparison circuit which compares a switchover reference value and a judgment element relevant to loss and corresponding to the operation state of the power converter, and when a difference arises therebetween, outputs a judgment command, a judgment circuit which, when the judgment command is inputted from the comparison circuit, judges the magnitude relationship between the judgment element and the switchover reference value, and when the judgment element is equal to or greater than the switchover reference value, outputs a switchover command for 2-level operation, and a switchover circuit which, when the switchover command for 2-level operation is inputted from the judgment circuit, turns off the AC switches and sequentially turns on the valve devices of the arms, so that the power converter comes into a 2-level operation state. That is, whether or not the judgment element relevant to loss of the power converter, e.g., DC current detected by a DC current detector, is equal to or greater than the switchover reference value (or the DC current is smaller than the switchover reference value), is judged.

As a result, when the DC current is equal to or smaller than the switchover reference value, 3-level operation is performed, and when the DC current is greater than the switchover reference value, 2-level operation is performed. Thus, operation with higher conversion efficiency is selected between the 3-level operation and the 2-level operation, to perform power conversion (see, for example, Patent Document 1).

CITATION LIST

Patent Document

Patent Document 1: Japanese Patent No. 5386640 (paragraphs [0008] to [0026], FIG. 1 to FIG. 4)

SUMMARY OF THE INVENTION

Problem to be Solved by the Invention

In the above conventional power conversion device, when a difference arises between the switchover reference value and the judgment element relevant to loss of the power converter, the judgment circuit outputs the switchover command for switching to 2-level operation. Then, in accordance with the switchover command, the power converter turns off the AC switches and sequentially turns on the valve devices of the arms, to shift from 3-level operation to 2-level operation. As described above, irrespective of the states of the switching elements composing the power converter, the switching elements connected to an intermediate potential are turned off instantly in accordance with the switchover command outputted when a difference arises between the switchover reference value and the judgment element relevant to loss. Therefore, depending on an operation switchover timing, disturbance of current, variation in torque, or the like occurs. In particular, if the switching element through which current is flowing is turned off, switching loss increases and operation becomes unstable at the time of mode switchover between 2-level operation and 3-level operation.

The present disclosure has been made to solve the above problem, and an object of the present disclosure is to provide a power conversion device that can stably switch the operation mode while suppressing disturbance of current, variation in torque, and the like due to switchover between 2-level operation and 3-level operation.

Means to Solve the Problem

A power conversion device according to the present disclosure includes: a power converter which has semiconductor elements and converts DC power from a DC circuit unit to AC power for an AC circuit unit; and a control unit which controls the power converter. The control unit has a 3-level operation mode of outputting AC voltage composed of 3-level voltages at a positive side and a negative side of the DC circuit unit and a voltage-division point of DC voltage between the positive side and the negative side of the DC circuit unit by performing ON/OFF control of the semiconductor elements, and a 2-level operation mode of outputting AC voltage composed of 2-level voltages at the positive side and the negative side of the DC circuit unit by performing ON/OFF control of the semiconductor elements. The control unit executes first switchover control for switching between the 2-level operation mode and the 3-level operation mode, at a timing when, among the semiconductor elements, a set semiconductor element according to a polarity of a voltage command for controlling the power converter is continuing to be ON.

Effect of the Invention

The power conversion device according to the present disclosure makes it possible to provide a power conversion device that can stably switch the operation mode while suppressing disturbance of current, variation in torque, and the like due to switchover between 2-level operation and 3-level operation.

BRIEF DESCRIPTION OF THE DRAWINGS

FIG. 14 shows an example of a hardware configuration of the control device.

DESCRIPTION OF EMBODIMENTS

Embodiment 1

Figure 1:
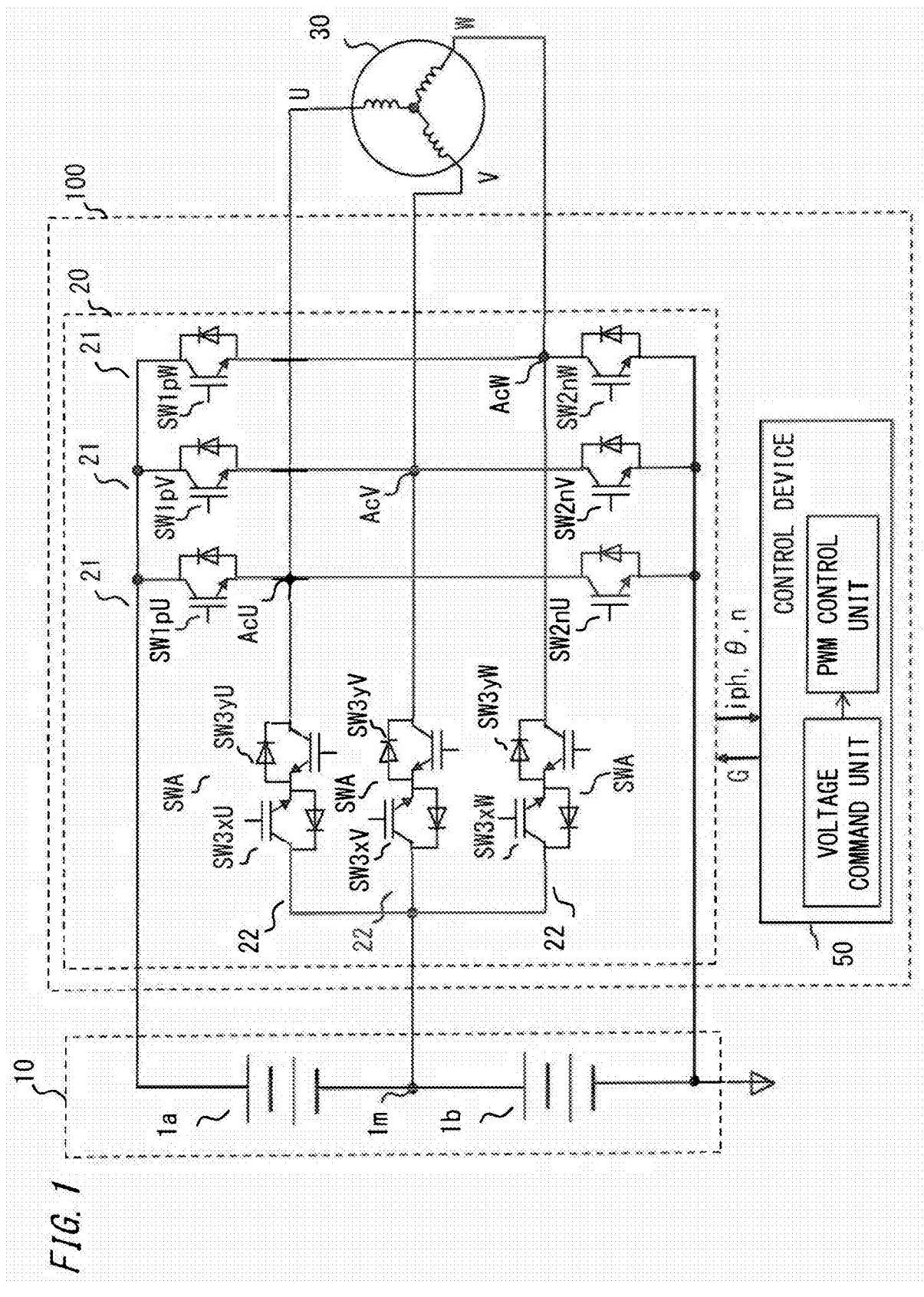
FIG. 1 is a block diagram showing a schematic configuration of a power conversion device according to embodiment 1.

FIG. 1 is a block diagram showing a schematic configuration of a power conversion device 100 according to embodiment 1.

In the present embodiment, an AC rotary machine driving system in which a control device is applied to a power converter having a three-phase inverter configuration for supplying power to an AC rotary machine, will be described.

The power conversion device 100 which is the AC rotary machine driving system includes a power converter 20 as a power conversion unit which converts DC power to AC power, a control device 50 as a control unit which controls the power converter 20, and a detection unit (not shown) which detects an operation state of the power converter 20.

The power conversion device 100 is provided between a DC circuit unit 10 and an AC rotary machine 30 as an AC circuit unit, and converts DC power inputted from the DC circuit unit 10, to AC power for the AC rotary machine 30.

The AC rotary machine 30 is an electric motor driven with three-phase AC, and is an induction machine, a permanent magnet synchronous machine, or the like.

The DC circuit unit 10 includes a DC power supply 1a as a first DC power supply unit and a DC power supply 1b as a second DC power supply unit.

The DC power supplies 1a, 1b each have a potential of Vdc/2 and are connected in series to each other to form the DC circuit unit 10. Thus, the DC circuit unit 10 has three potentials, i.e., voltage 0 [V] at the negative side of the DC circuit unit 10, voltage Vdc/2 [V] at a voltage-division point 1m which is a connection part between the DC power supply 1a and the DC power supply 1b, and voltage Vdc [V] at the positive side.

In the present embodiment, the case where the DC circuit unit 10 is formed by connecting, in series, two DC power supplies 1a, 1b each capable of outputting voltage Vdc/2 [V], is shown. However, the DC circuit unit 10 is not limited thereto.

For example, the DC circuit unit may have a configuration in which a DC power supply capable of outputting voltage Vdc [V] is provided and two capacitors are connected in series between the positive side and the negative side of the DC power supply, thus dividing the DC voltage Vdc between the positive side and the negative side of the DC power supply. The DC circuit unit 10 may have any configuration that has three different potentials and is capable of outputting voltages having these potentials.

The power converter 20 includes switching elements SW1 (SW1*p*U, SW1*p*V, SW1*p*W), SW2 (SW2*n*U, SW2*n*V, SW2*n*W), and SW3 (SW3*x*U, SW3*x*V, SW3*x*W, SW3*y*U, SW3*y*V, SW3*y*W) as semiconductor elements for controlling conduction and interruption on power supply paths.

It suffices that the switching elements SW (SW1, SW2, SW3) have switching functions, and in the present embodiment, insulated gate bipolar transistors (IGBTs) are used. In addition, diodes as semiconductor elements for controlling conduction and interruption on power supply paths are connected in anti-parallel to the switching elements SW.

The power converter 20 includes first arms 21 for respective phases which are formed by connecting, in series, set switching elements SW1 (SW1*p*U, SW1*p*V, SW1*p*W) as first semiconductor switches and set switching elements SW2 (SW2*n*U, SW2*n*V, SW2*n*W) as second semiconductor switches, respectively, and the first arms 21 are connected in parallel between the positive side and the negative side of the DC circuit unit 10.

In the first arms 21, connection points between the switching elements SW1 (SW1$p$U, SW1$p$V, SW1$p$W) connected to the positive side of the DC circuit unit 10 and the switching elements SW2 (SW2$n$U, SW2$n$V, SW2$n$W) connected to the negative side of the DC circuit unit 10, serve as AC terminals AcU, AcV, AcW for respective phases for outputting AC voltage.

Further, the power converter 20 includes second arms 22 having bidirectional switches SWA, between the voltage-division point 1$m$ of the DC circuit unit 10 and the AC terminals AcU, AcV, AcW for respective phases.

The bidirectional switches SWA are formed by connecting, in anti-series, switching elements SW3$x$ (SW3$x$U, SW3$x$V, SW3$x$W) as third semiconductor switches and switching elements SW3$y$ (SW3$y$U, SW3$y$V, SW3$y$W) as third semiconductor switches, respectively, and currents to flow in both of forward and reverse directions are controlled with the bidirectional switches SWA.

Thus, the switching elements SW1 (SW1$p$U, SW1$p$V, SW1$p$W) forming upper arms of the first arms 21 are connected between Vdc [V] at a high potential and the AC terminals Ac (AcU, AcV, AcW). The switching elements SW2 (SW2$p$U, SW2$p$V, SW2$p$W) forming lower arms of the first arms 21 are connected between 0 [V] at a low potential and the AC terminals Ac (AcU, AcV, AcW).

Since the power converter 20 is configured as described above, semiconductor elements having withstand voltage greater than the voltage Vdc [V] need to be used for the switching elements SW1 (SW1$p$U, SW1$p$V, SW1$p$W) and the switching elements SW2 (SW2$p$U, SW2$p$V, SW2$p$W).

On the other hand, in the second arms 22, semiconductor elements having withstand voltage greater than the potential Vdc/2 may be used for the switching elements SW3 (SW3$x$U, SW3$x$V, SW3$x$W, SW3$y$U, SW3$y$V, SW3$y$W) forming the bidirectional switches SWA connected to the voltage-division point 1$m$ having the potential Vdc/2. Therefore, elements that are small in loss and low in cost can be used for the switching elements SW3.

The control device 50 detects, by a detector or the like (not shown), phase current iph for each AC phase, a rotor position θ of the AC rotary machine 30, a rotation speed n, or the like as an element indicating the operation state of the power converter 20, and outputs the detected element to the control device 50.

Hereinafter, control by the control device 50 which controls the power converter 20 configured as described above will be described.

Figure 2:
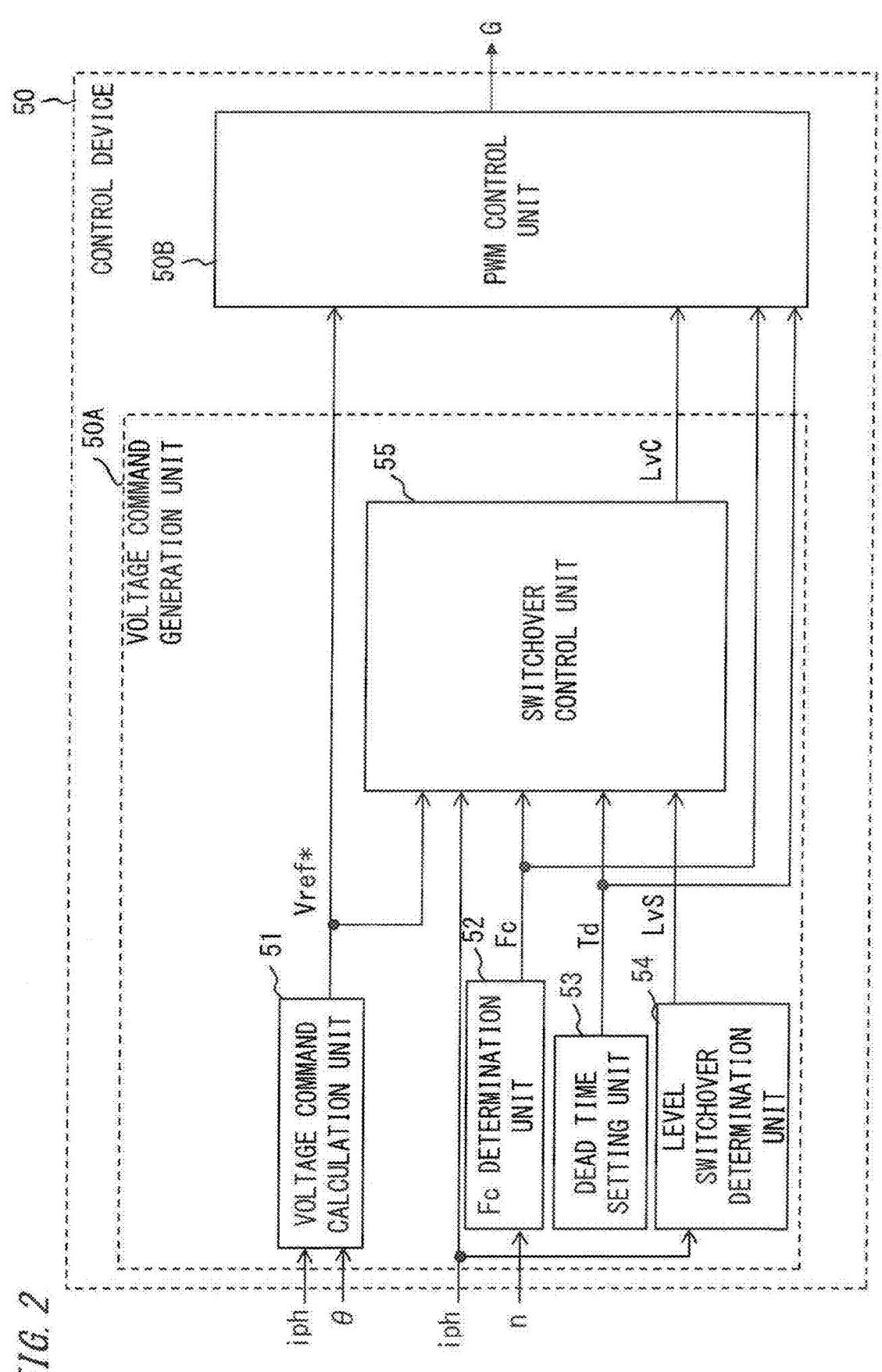
FIG. 2 is a function block diagram of a control device which controls a power converter according to embodiment 1.

FIG. 2 is a function block diagram of the control device 50 which controls the power converter 20 according to the present embodiment 1.

Figure 3:
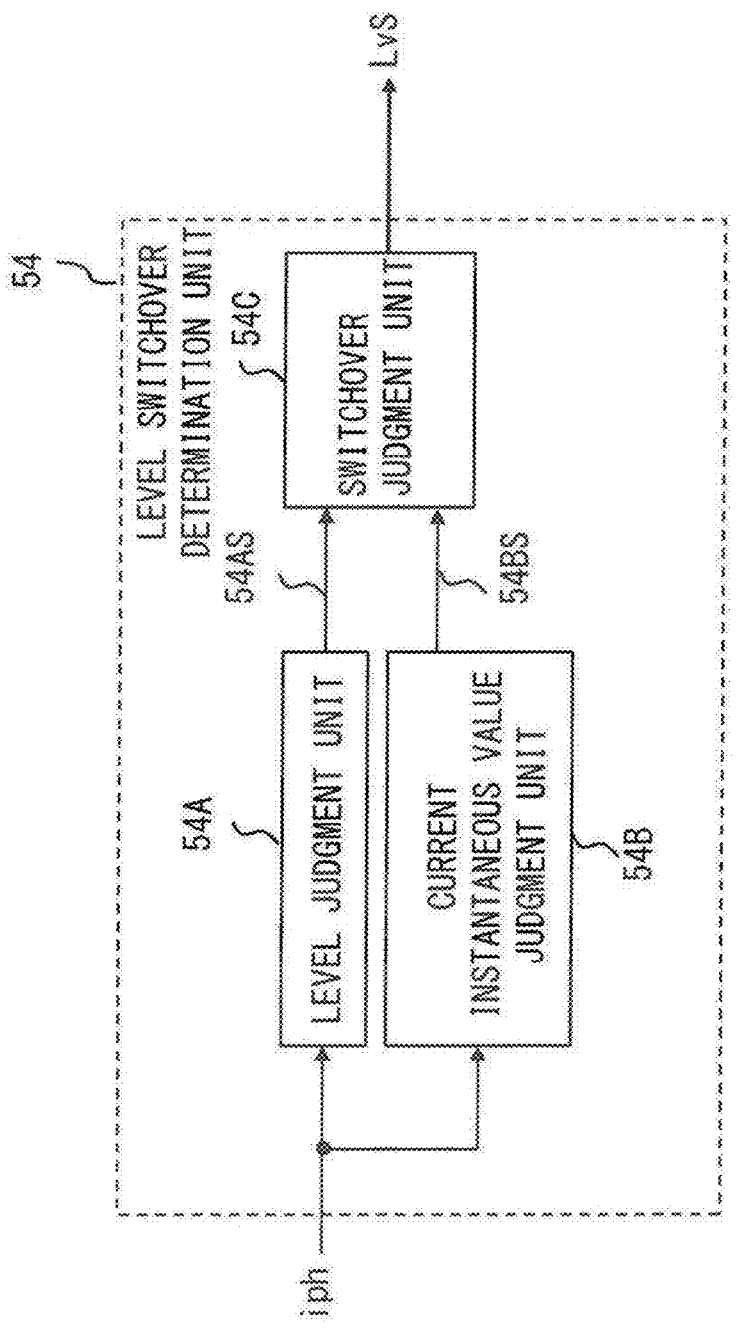
FIG. 3 is a function block diagram showing a configuration of a level switchover determination unit included in the control device according to embodiment 1.

FIG. 3 is a function block diagram showing a configuration of a level switchover determination unit 54 included in the control device 50 according to embodiment 1.

As shown in FIG. 2, the control device 50 includes a voltage command generation unit 50A and a PWM control unit 50B.

The voltage command generation unit 50A generates a voltage command Vref* for each AC phase, a signal for specifying a carrier frequency Fc, a signal for specifying a dead time Td, and a switchover signal LvC described later, and outputs them to the PWM control unit 50B at the subsequent stage.

The PWM control unit 50B performs PWM control on the basis of the voltage command Vref* for each AC phase, the carrier frequency Fc, the dead time Td, and the switchover signal LvC inputted from the voltage command generation unit 50A, and generates and outputs switching signals G for controlling the switching elements SW of the power converter 20.

First, the detailed configuration of the voltage command generation unit 50A and control therein will be described.

The voltage command generation unit 50A includes a voltage command calculation unit 51, a carrier frequency (Fc) determination unit 52, a dead time setting unit 53, the level switchover determination unit 54, and a switchover control unit 55.

In accordance with commands of speed, torque, and the like for the AC rotary machine 30 from a host control device (not shown), the voltage command calculation unit 51 calculates voltage commands Vref* (VrefU*, VrefV*, VrefW*) for respective AC phases on the basis of the phase currents iph for respective AC phases, the rotor position θ of the AC rotary machine 30, and the like detected by detectors or the like (not shown). The voltage commands Vref* for respective phases are outputted as values normalized with Vdc/2.

In accordance with a torque command from the host control device (not shown), the carrier frequency (Fc) determination unit 52 determines the carrier frequency Fc to be used in PWM control so as to minimize loss in the power converter 20 and the AC rotary machine 30, on the basis of the rotation speed n of the AC rotary machine 30 detected by a detector (not shown).

For the switching elements SW forming the first arm 21 for each phase, the dead time setting unit 53 sets a dead time Td which is a time during which the switching elements SW1, SW2 subjected to complementary switching are prohibited from turning on at the same time, in order to prevent the switching elements SW1, SW2 from being short-circuited.

The level switchover determination unit 54 generates a level specification signal LvS for specifying whether to set 2-level operation or 3-level operation as the operation mode of the power converter 20. Hereinafter, a generation method for the level specification signal LvS will be described.

The level switchover determination unit 54 includes a level judgment unit 54A, a current instantaneous value judgment unit 54B, and a switchover judgment unit 54C, as shown in a configuration diagram in FIG. 3.

On the basis of the detected phase current iph for each AC phase, the level judgment unit 54A calculates an effective value irms of the phase current iph.

Then, when the effective value irms of the phase current iph is greater than a predetermined threshold ith1, the level judgment unit 54A outputs a specification signal 54AS so as to specify the operation mode of the power converter 20 as 2-level operation. On the other hand, when the effective value irms of the phase current iph is equal to or smaller than the predetermined threshold ith1, the level judgment unit 54A outputs the specification signal 54AS so as to specify the operation mode of the power converter 20 as 3-level operation.

As described above, the level judgment unit 54A judges whether to set 2-level operation or 3-level operation as the operation mode of the power converter 20, in accordance with the magnitude of the effective value irms of the phase current iph which is an element indicating the operation state of the power converter 20. Thus, the operation mode according to loss in the power converter 20 is selected.

As an element indicating the operation state of the power converter 20, the effective value irms of the phase current iph is used, but another element may be used. As an element indicating the operation state of the power converter 20, the level judgment unit 54A may use the rotation speed or torque of the AC rotary machine 30, for example.

When the detected instantaneous values of the phase currents iph for all the three phases are in a predetermined first threshold range ith2 centered at 0, the current instantaneous value judgment unit 54B outputs "1" as an output signal 54BS, and when the instantaneous values are outside the first threshold range ith2, the current instantaneous value judgment unit 54B outputs "0" as the output signal 54BS. In the present embodiment, the threshold ith2 is set to be greater than the center value 0 by a set value. That is, in the present embodiment, the output signal 54BS becomes "1" only in a phase range where the instantaneous values of the phase currents iph for all the three phases are outside the first threshold range ith2 centered at 0.

When the output signal 54BS outputted from the current instantaneous value judgment unit 54B is "1", the switchover judgment unit 54C updates the level specification signal LvS by the specification signal 54AS outputted from the level judgment unit 54A and specifying the operation mode, and outputs the level specification signal LvS.

When the output signal 54BS outputted from the current instantaneous value judgment unit 54B is "0", the switchover judgment unit 54C does not update the level specification signal LvS. Thus, in the present embodiment, update of the level specification signal LvS is performed only in a phase range where the instantaneous values of the phase currents iph for all the three phases are outside the first threshold range ith2 centered at 0.

As described above, the phase voltage commands Vref* generated by the voltage command calculation unit 51, the carrier frequency Fc determined by the carrier frequency (Fc) determination unit 52, the dead time Td determined by the dead time setting unit 53, and the level specification signal LvS determined by the level switchover determination unit 54 are inputted to the switchover control unit 55 at the subsequent stage.

On the basis of the inputted signals, the switchover control unit 55 generates the switchover signal LvC for specifying a timing of performing first switchover control for switching the operation mode of the power converter 20 between 2-level operation and 3-level operation. The generated switchover signal LvC is inputted to the PWM control unit 50B at the subsequent stage. A generation method for the switchover signal LvC in the switchover control unit 55 will be described later.

Next, the PWM control unit 50B will be described.

Figure 4:
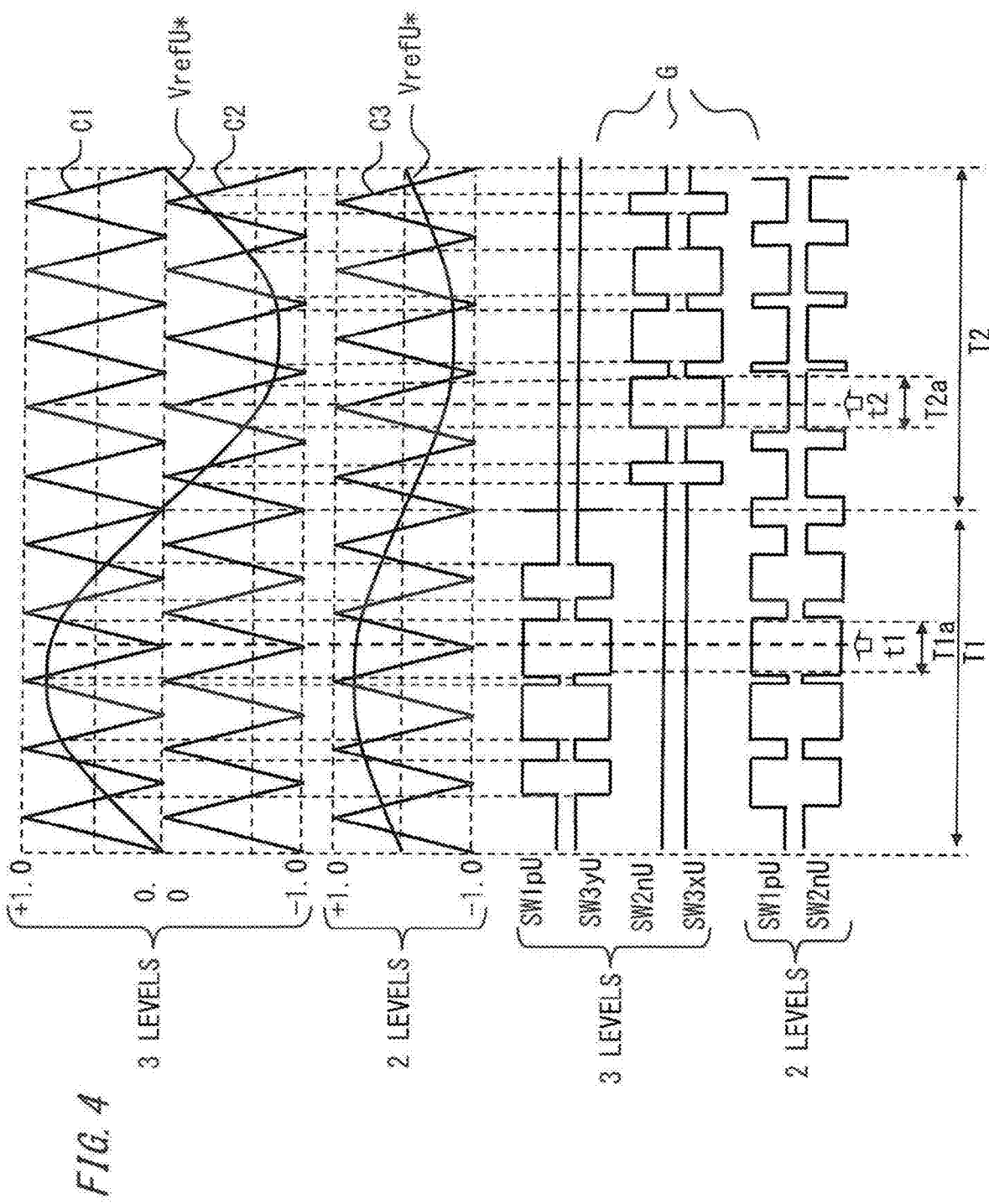
FIG. 4 shows a generation method for switching signals G in 3-level operation and 2-level operation in PWM control by a PWM control unit according to embodiment 1.

FIG. 4 shows a generation method for the switching signals G in 3-level operation and 2-level operation in PWM control by the PWM control unit 50B according to embodiment 1.

In FIG. 4, an example of PWM control for U phase is shown as a representative, but the same applies to V phase and W phase.

The PWM control unit 50B performs amplitude comparison between the voltage command VrefU* for U phase and triangular carrier waves C, to generate the switching signals G for controlling the switching elements SW.

A case where the operation mode of the power converter 20 is 3-level operation will be described.

As shown in FIG. 4, the PWM control unit 50B performs amplitude comparison between the U-phase voltage command VrefU* and two carrier waves C1, C2.

The carrier wave C1 is a signal having an amplitude of +1.0 to 0.0, and the carrier wave C2 is a signal having an amplitude of 0.0 to −1.0. The carrier wave C1 and the carrier wave C2 are the same in phase and different only in amplitude. The U-phase voltage command VrefU* is a signal having an amplitude of −1.0 to +1.0. These signals are all processed as normalized values.

The PWM control unit 50B compares the U-phase voltage command VrefU* and the carrier wave C1, to generate the switching signals G for turning on/off the switching element SW1*p*U connected to the positive side of the DC circuit unit 10 and the switching element SW3*y*U forming the bidirectional switch SWA connected to the voltage-division point 1*m* of the DC circuit unit 10. Thus, at the AC terminal AcU of the power converter 20, voltage Vdc at the positive side of the DC circuit unit 10 or voltage Vdc/2 at the voltage-division point 1*m* is outputted.

Meanwhile, the PWM control unit 50B compares the U-phase voltage command VrefU* and the carrier wave C2, to generate the switching signals G for turning on/off the switching element SW2*n*U connected to the negative side of the DC circuit unit 10 and the switching element SW3*x*U forming the bidirectional switch SWA connected to the voltage-division point 1*m* of the DC circuit unit 10. Thus, at the AC terminal AcU of the power converter 20, voltage of 0 at the negative side of the DC circuit unit 10 or voltage Vdc/2 at the voltage-division point 1*m* is outputted.

Through control in the PWM control unit 50B as described above, the control device 50 performs 3-level operation of controlling the AC rotary machine 30 by outputting AC voltage composed of 3-level voltages having different potentials at the positive side, the negative side, and the voltage-division point 1*m* of the DC circuit unit 10.

Next, a case where the operation mode of the power converter 20 is 2-level operation will be described.

In this case, as shown in FIG. 4, the PWM control unit 50B performs amplitude comparison between the U-phase voltage command VrefU* and one carrier wave C3.

The carrier wave C3 is a signal having an amplitude of +1.0 to −1.0, and has the same phase as the carrier wave C1 and the carrier wave C2, while only the amplitude is different.

The PWM control unit 50B compares the U-phase voltage command VrefU* and the carrier wave C3, to generate the switching signals G for turning on/off the switching element SW1*p*U connected to the positive side of the DC circuit unit 10 and the switching element SW2*n*U connected to the negative side of the DC circuit unit 10. Thus, at the AC terminal AcU of the power converter 20, voltage Vdc at the positive side of the DC circuit unit 10 or voltage of 0 at the negative side thereof is outputted.

Through such control, the control device 50 performs 2-level operation of controlling the AC rotary machine 30 by outputting AC voltage composed of 2-level voltages having different potentials at the positive and negative sides of the DC circuit unit 10.

The frequencies of the triangular carrier wave C (C1, C2, C3) shown in FIG. 4 are determined by the carrier frequency Fc inputted to the PWM control unit 50B.

Hereinafter, a circuit configuration of the PWM control unit 50B for executing the PWM control as described above will be described.

Figure 5:
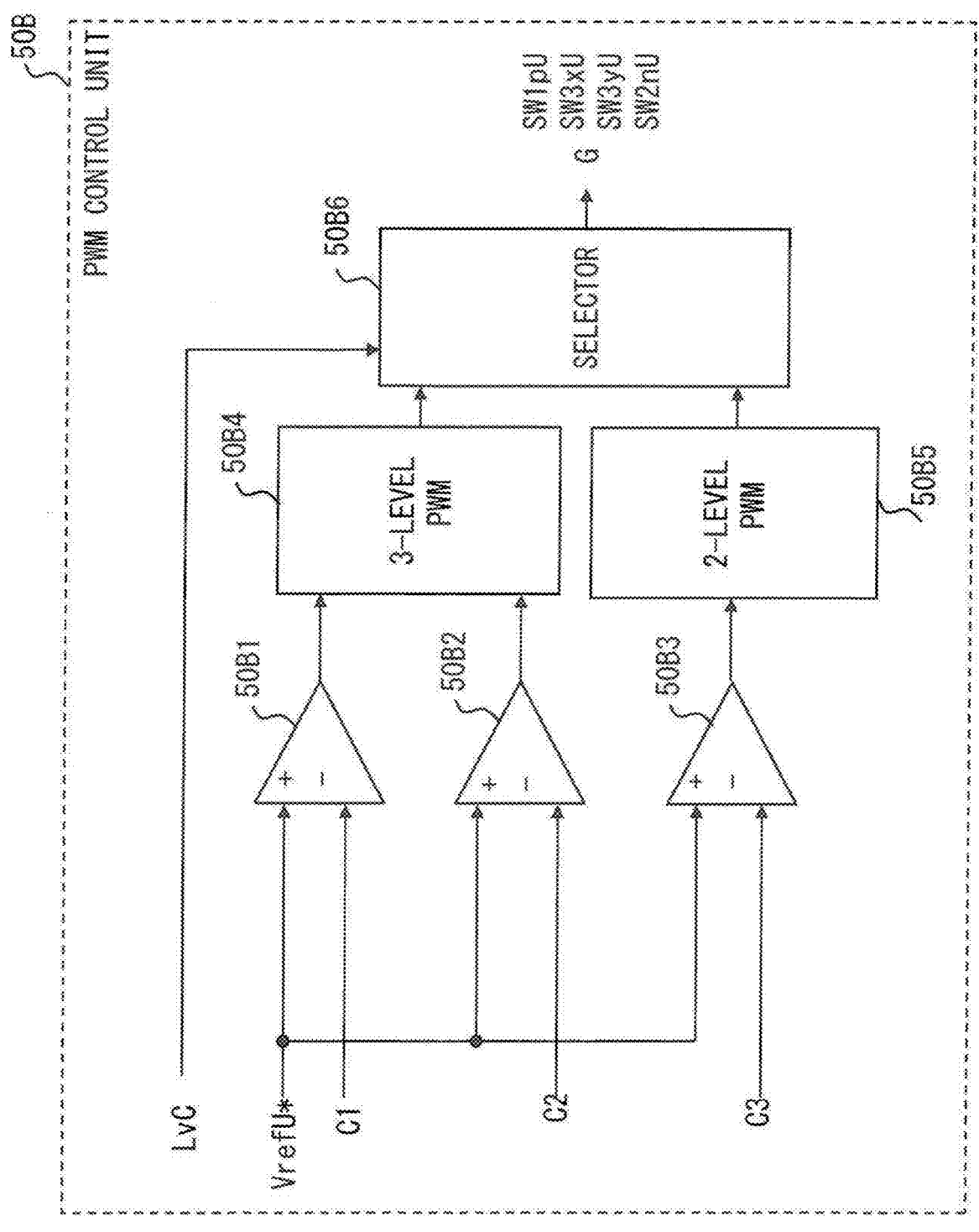
FIG. 5 is a function block diagram of the PWM control unit according to embodiment 1.

FIG. 5 is a function block diagram of the PWM control unit 50B according to embodiment 1, and shows control by PWM performed through comparison between the voltage command Vref* and the carrier waves C, and a switchover method between 2-level operation and 3-level operation. Description will be given using the U-phase voltage command VrefU*, as an example.

The inputted U-phase voltage command VrefU* is compared with the carrier wave C1 in a comparator 50B1, and compared with the carrier wave C2 in a comparator 50B2.

Then, the switching signals G for 3-level operation for driving the switching elements SW1pU, SW3yU, SW3xU, SW2nU are generated and inputted to a 3-level PWM unit 50B4.

The 3-level PWM unit 50B4 performs processing such as adding the dead time Td to the inputted switching signals G, and outputs the resultant signals to a selector 50B6.

In addition, the inputted U-phase voltage command VrefU* is compared with the carrier wave C3 in a comparator 50B3. Then, the switching signals G for 2-level operation for driving the switching elements SW1pU, SW2nU are generated and inputted to a 2-level PWM unit 50B5.

The 2-level PWM unit 50B5 generates the switching signals G for constantly turning off the switching elements SW3xU, SW3yU connected to the voltage-division point 1m having the potential Vdc/2, performs processing such as adding the dead time Td to the inputted switching signals G for driving the switching elements SW1pU, SW2nU, and outputs the resultant signals to the selector 50B6.

As described above, outputs of the 3-level PWM unit 50B4 and the 2-level PWM unit 50B5 are inputted to the selector 50B6. In addition, the switchover signal LvC is inputted to the selector 50B6. As described above, the switchover signal LvC is to make an instruction for switching the operation mode of the power converter between 2-level operation and 3-level operation. At the timing when the switchover signal LvC is inputted, the selector 50B6 selects either the switching signals G inputted from the 2-level PWM unit 50B5 or the switching signals G inputted from the 3-level PWM unit 50B4, in accordance with the level specified by the switchover signal LvC, and outputs the selected signals as the switching signals G. When the switchover signal LvC is not inputted, the selector 50B6 continues to select and output the switching signals G corresponding to the level selected at present.

Here, the description has been given for U phase, as an example. In a case of V phase, the same processing as described above is performed for the switching elements SW1pV, SW2nV, SW3xV, SW3yV, and in a case of W phase, the same processing as described above is performed for the switching elements SW1pW, SW2nW, SW3xW, SW3yW.

As described above, the switching signals G for controlling the switching elements SW for respective phases are generated from the respective phase voltage commands Vref* for three-phase AC, to perform PWM control.

Next, the switchover signal LvC for specifying a timing of performing first switchover control for switching the operation mode of the power converter 20 between 2-level operation and 3-level operation, will be described.

As shown in FIG. 4, in a case where the polarity of the U-phase voltage command VrefU* is positive, i.e., in a phase region T1 where the U-phase voltage command VrefU* is 0 to +1.0, SW1pU is ON in both of 2-level operation and 3-level operation, at a phase where the U-phase voltage command VrefU* is greater than the carrier wave C (C1, C3). That is, in the phase region T1, SW1pU is ON in both of 2-level operation and 3-level operation, in a phase range T1a centered at a bottom-side peak phase of the carrier wave C (C1, C3).

If the voltage command VrefU* for U phase and the current iu for U phase have the same phase, the current iu at this time flows from the positive side of the DC circuit unit 10 at a high potential to the AC rotary machine 30 via the AC terminal AcU.

On the other hand, in a case where the polarity of the U-phase voltage command VrefU* is negative, i.e., in a phase region T2 where the U-phase voltage command VrefU* is −1.0 to 0, SW2nU is ON in both of 2-level operation and 3-level operation, at a phase where the U-phase voltage command VrefU* is smaller than the carrier wave C (C1, C3). That is, in the phase region T2, SW2nU is ON in both of 2-level operation and 3-level operation, in a phase range T2a centered at a top-side peak phase of the carrier wave C (C2, C3).

If the voltage command VrefU* and the current iu for U phase have the same phase, the current iu at this time flows from the AC rotary machine 30 to the negative side of the DC circuit unit 10 at a low potential via the AC terminal AcU.

Here, as shown in FIG. 1, the second arm 22 having the bidirectional switch SWA is provided between the AC terminal AcU and the voltage-division point 1m of the DC circuit unit 10. Therefore, if the first switchover control for switching the operation mode of the power converter 20 between 2-level operation and 3-level operation is performed in the phase range T1a or the phase range T2a, the switching elements SW3xU, SW3uU forming the bidirectional switch SWA connected to the intermediate potential Vd/2 are turned on/off in a state in which almost no current is flowing through the switching elements SW3xU, SW3uU, to switch the operation mode. Thus, it becomes possible to stably switch the operation mode without causing disturbance of current and variation in torque.

As shown in FIG. 4, in the present embodiment, a first timing which is a timing when the first switchover control is performed in the phase range T1a is a timing t1 at the bottom-side peak phase of the carrier wave C.

A second timing which is a timing when the first switchover control is performed in the phase range T2a is a timing t2 at the top-side peak phase of the carrier wave C.

As described above, the power conversion device 100 of the present embodiment performs the first switchover control for switching the operation mode of the power converter 20 between 2-level operation and 3-level operation, at a timing when the switching element SW1pU or the switching element SW2nU which is a set switching element according to the polarity of the voltage command Vref* for controlling the power converter 20, among a plurality of semiconductor elements, is continuing to be ON.

The timing when the set switching element SW1pU or switching element SW2nU is continuing to be ON is determined in accordance with the polarity of the voltage command Vref*.

Hereinafter, the switchover control unit 55 which generates the switchover signal LvC for specifying the first timing (t1) and the second timing (t2) which are timings of performing the first switchover control of the power converter 20, will be described.

Figure 6:
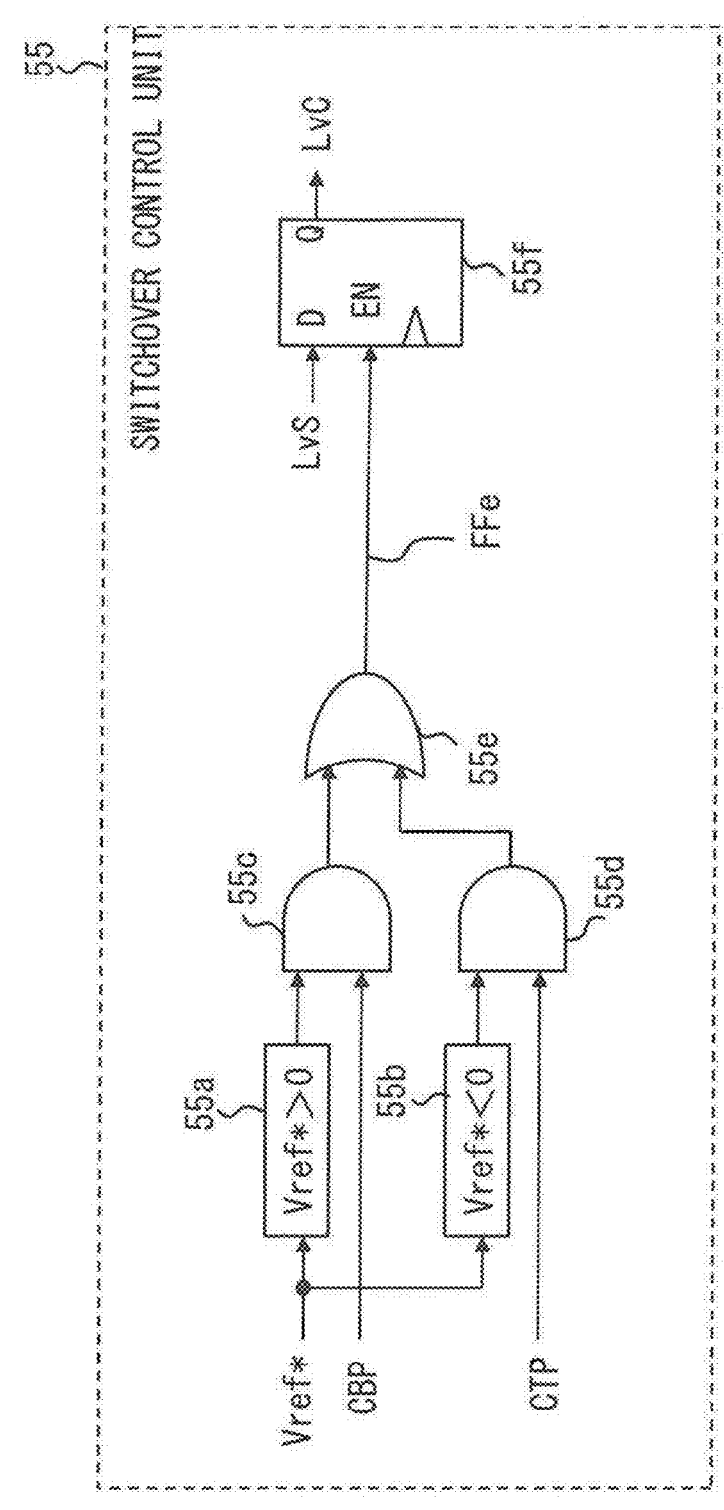
FIG. 6 is a block diagram showing a schematic configuration of a switchover control unit included in the control device according to embodiment 1.

FIG. 6 is a block diagram showing a schematic configuration of the switchover control unit 55 included in the control device 50 according to embodiment 1.

Figure 7:
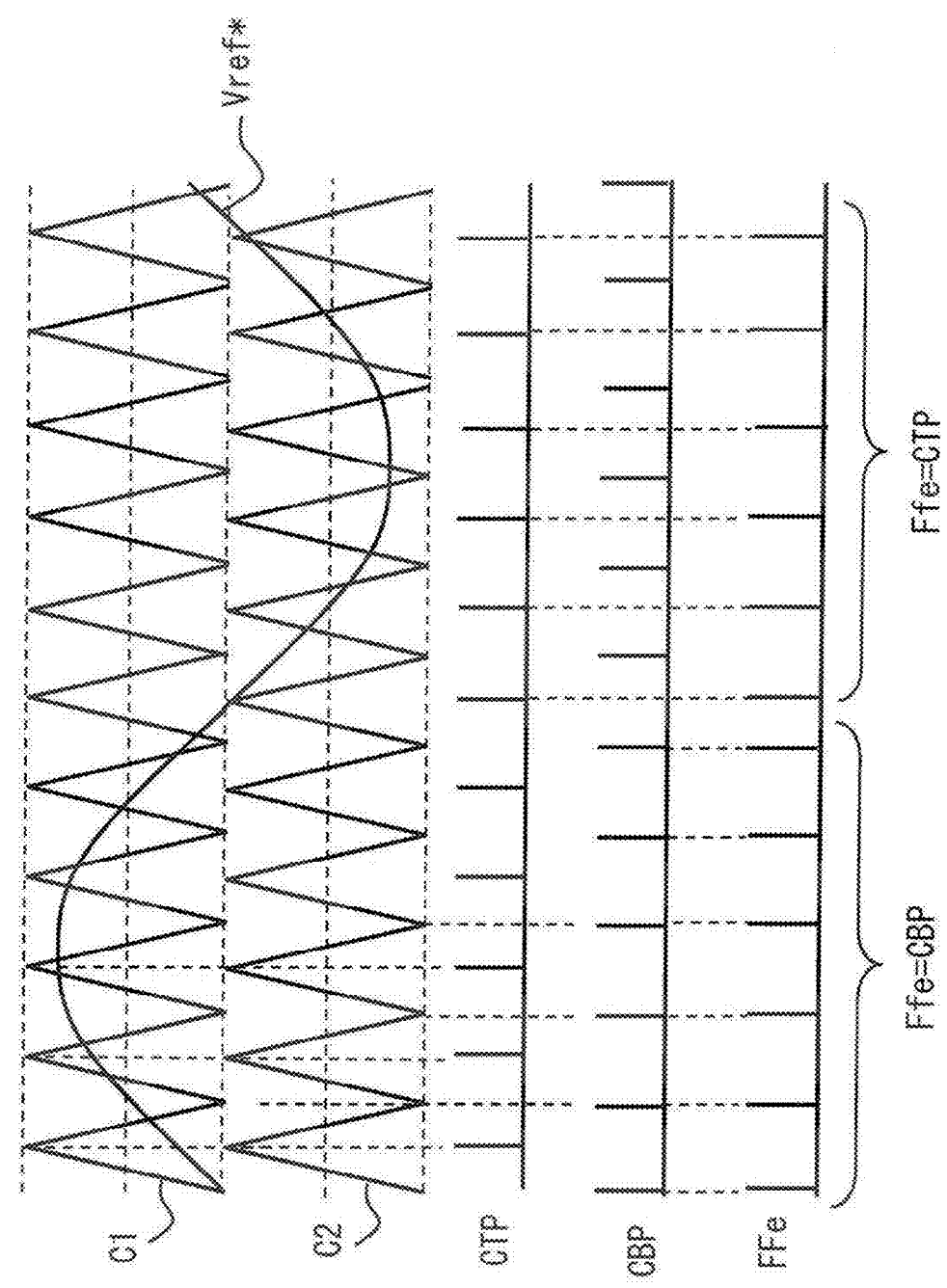
FIG. 7 illustrates timings of performing first switchover control in the control device according to embodiment 1.

FIG. 7 illustrates timings of performing the first switchover control during execution of the 3-level operation mode in the control device 50 of embodiment 1.

Here, an example of a generation method for the switchover signal LvC for U phase will be described as a representative, but the same applies to cases of V phase and W phase. In addition, timings of performing the first switchover control during execution of the 2-level operation mode are also the same.

As shown in FIG. 6, the switchover control unit 55 includes judgment circuits 55a, 55b, AND circuits 55c, 55d, an OR circuit 55e, and a flip-flop circuit 55f.

The voltage command Vref* for U phase generated by the voltage command calculation unit 51 is inputted to the judgment circuits 55a, 55b.

The judgment circuit 55a judges whether or not the voltage command Vref* is greater than zero, and if the voltage command Vref* is greater than zero, i.e., if the polarity of the voltage command Vref* is positive, the judgment circuit 55a outputs '1'.

The judgment circuit 55b judges whether or not the voltage command Vref* is smaller than zero, and if the voltage command Vref* is smaller than zero, i.e., if the polarity of the voltage command Vref* is negative, the judgment circuit 55b outputs '1'.

Here, a carrier top pulse CTP shown in FIG. 7, which is a signal generated by a controller (not shown), is a narrow pulse signal which becomes '1' in synchronization with the timing of the top-side peak phase of the carrier wave C and has a narrow pulse width.

A carrier bottom pulse CBP shown in FIG. 7, which is a signal generated by a controller (not shown), is a narrow pulse signal which becomes '1' in synchronization with the bottom-side timing of the carrier wave C and has a narrow pulse width.

An output of the judgment circuit 55a and the carrier bottom pulse CBP are inputted to the AND circuit 55c. An output of the judgment circuit 55b and the carrier top pulse CTP are inputted to the AND circuit 55d. The AND circuits 55c, 55d output '1' when the two inputted signals are both '1'.

The OR circuit 55e outputs '1' when either of the two inputs is '1'.

An output of the OR circuit 55e is defined as an FF enable signal FFe which is a basic signal.

The flip-flop circuit 55f receives, at a D terminal input, the level specification signal LvS which specifies whether to set 2-level operation or 3-level operation as the operation mode of the power converter 20.

The flip-flop circuit 55f operates in synchronization with an input system clock, and an output Q is latched with the D terminal input when the FF enable signal FFe is '1'. As a result, the level specification signal LvS is reflected in the switchover signal LvC at a timing when the FF enable signal is '1'. The switchover signal LvC outputted from the Q terminal output of the flip-flop circuit 55f is connected as a mode switchover signal for the PWM control unit 7.

As a result, either the carrier top pulse CTP or the carrier bottom pulse CBP is selected and outputted. Even in a case where there are voltage commands for three phases, the FF enable signal FFe for each phase is outputted within a half cycle of the carrier wave C.

Thus, as shown in FIG. 7, in a phase region where the polarity of the voltage command Vref* is positive, the FF enable signal FFe as a basic signal is generated in synchronization with the respective bottom-side peak phases as the first timings in the carrier wave C when the switching element SW1pU connected to the positive side of the DC circuit unit 10 is ON.

Also, similarly, in a phase region where the polarity of the voltage command Vref* is negative, the FF enable signal FFe as a basic signal is generated in synchronization with the respective top-side peak phases as the second timings in the carrier wave C when the switching element SW2nU connected to the negative side of the DC circuit unit 10 is ON.

Hereinafter, a timing of performing the first switchover control in each of U phase, V phase, and W phase will be described.

Figure 8:
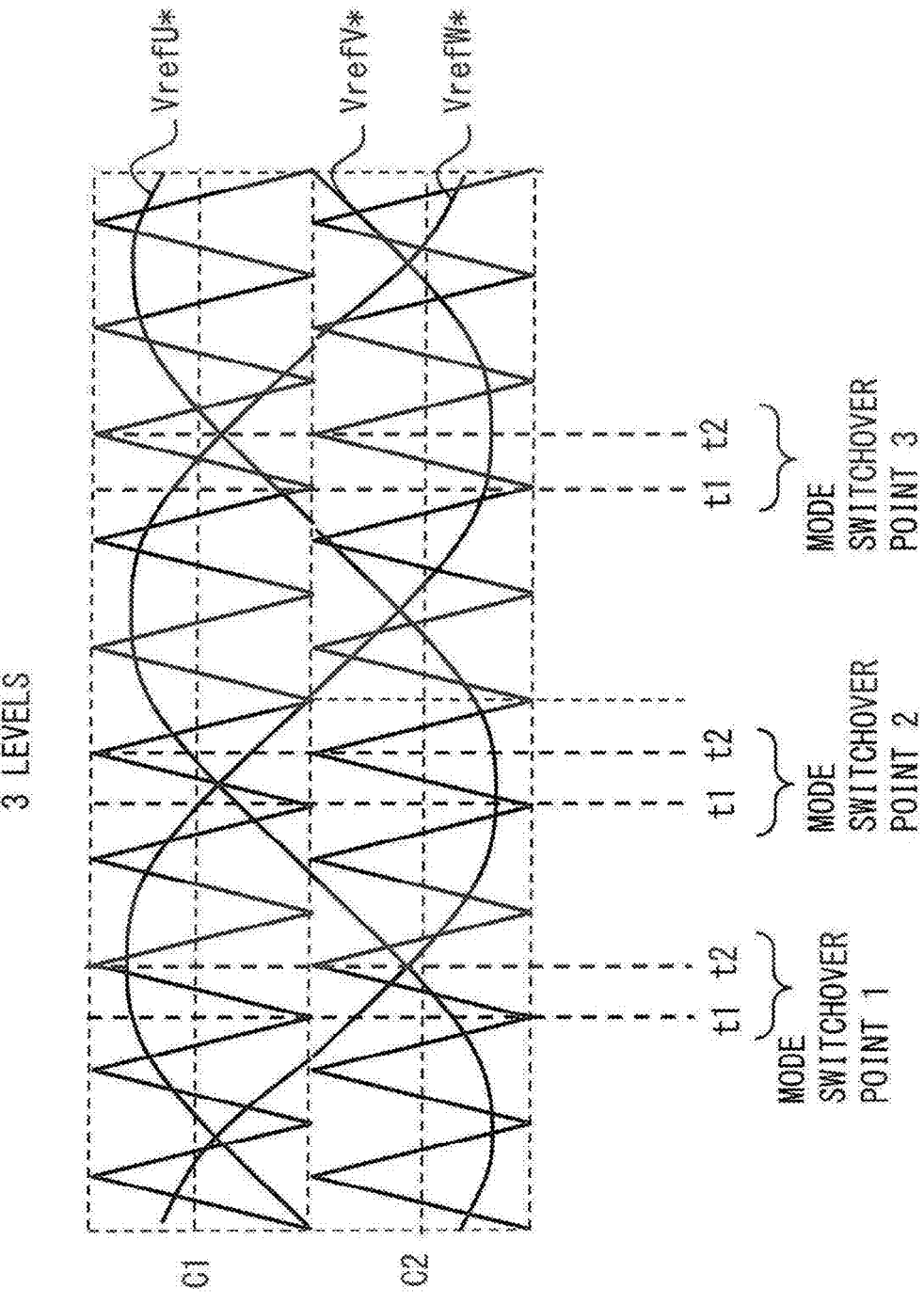
FIG. 8 shows timings of performing first switchover control for respective AC phases according to embodiment 1.

FIG. 8 shows timings of performing the first switchover control for respective phases during 3-level operation in PWM using the voltage commands VrefU*, VrefV*, VrefW* for U phase, V phase, W phase.

In the present embodiment, the first switchover control for each phase is executed at one of two peak phases consecutive in the time-axis direction in the carrier wave C.

For example, as shown in FIG. 8, at a mode switchover point 1, the first switchover control for V phase is executed at the first timing t1 at the bottom-side peak phase of the carrier wave C, and then switchover control for U phase and W phase is executed at the second timing (t2) at the top-side peak phase consecutive in the time-axis direction with the bottom-side peak phase. The same applies to a mode switchover point 2 and a mode switchover point 3.

Thus, the first switchover control for each phase is executed at one of two peak phases consecutive in the time-axis direction in the carrier wave C, whereby the first switchover control for all the three phases can be performed within a half cycle of the carrier wave C, to switch the operation mode.

Therefore, it is possible to switch the operation mode without causing a time lag among phases.

Next, a power conversion device 100e having a configuration different from the power conversion device 100 shown in FIG. 1 will be described.

Figure 9:
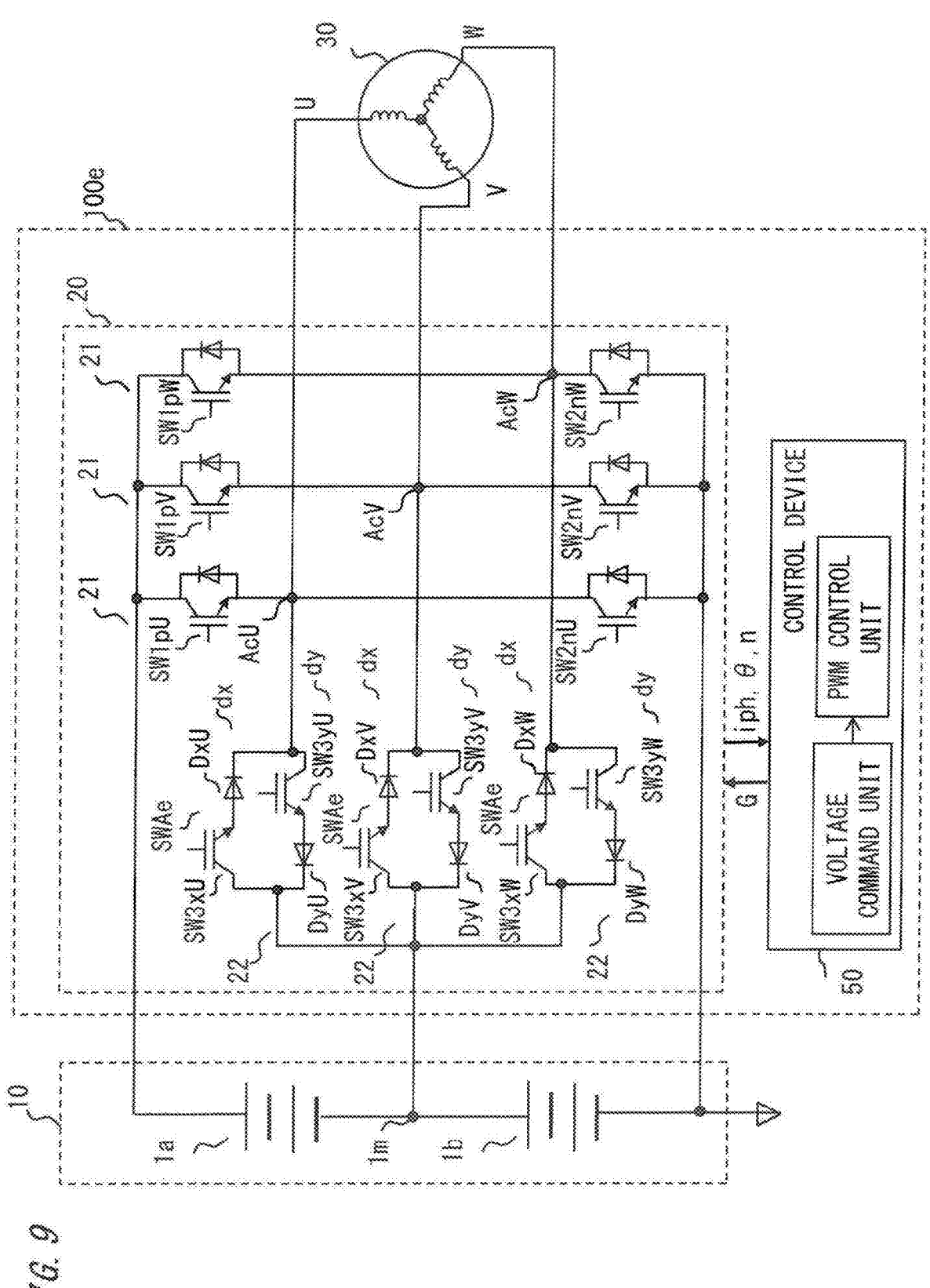
FIG. 9 is a block diagram showing a schematic configuration of a power conversion device according to embodiment 1.

FIG. 9 is a block diagram showing a schematic configuration of the power conversion device 100e according to embodiment 1.

The power conversion device 100e shown in FIG. 9 is different in a configuration of a bidirectional switch SWAe connected to the voltage-division point 2m of the DC circuit unit 10, as compared to the power conversion device 100 shown in FIG. 1.

In the power conversion device 100e, diodes Dx (DxU, DxV, DxW) as semiconductor elements are respectively connected in series to the switching elements SW3x (SW3xU, SW3xV, SW3xW) as third semiconductor elements, thus forming series units dx.

In addition, diodes Dy (DyU, DyV, DyW) as semiconductor elements are respectively connected in series to the switching elements SW3y (SW3yU, SW3yV, SW3yW) as third semiconductor elements, thus forming series units dy.

Then, in each phase, the two series units dx and dy are connected in anti-parallel to each other, thus forming the bidirectional switch SWAe.

Also in the power conversion device 100e having the above configuration, the first switchover control for switching between the 2-level operation mode and the 3-level operation mode is executed at the first timing in the carrier signal when the semiconductor switch SW1 is ON or the second timing in the carrier signal when the semiconductor switch SW2 is ON, whereby the operation mode can be switched at a timing when current is not flowing through the switching element SW3 forming the bidirectional switch SWA. Thus, it is possible to suppress variation in current and variation in torque due to switchover of the operation mode.

In the above description, the case where the power converter has a configuration capable of outputting three-phase AC has been shown, but the power converter may have a single-phase configuration.

In the above description, among a plurality of semiconductor elements included in the power converter 20, the set semiconductor element is the switching element SW1

(SW1$p$U, SW1$p$V, SW1$p$W) connected to the positive side of the DC circuit unit 10 or the switching element SW2 (SW2$n$U, SW2$n$V, SW2$n$W) connected to the negative side of the DC circuit unit 10, as an example.

However, the set semiconductor element is not limited to the switching elements SW1, SW2, and may be a semiconductor element that ensures, by being turned on, such a current path that current does not flow to another semiconductor element, so as not to cause disturbance of current at a timing of switchover between the 2-level operation mode and the 3-level operation mode.

The power conversion device of the present embodiment configured as described above is a power conversion device including:

a power converter which has semiconductor elements and converts DC power from a DC circuit unit to AC power for an AC circuit unit; and a control unit which controls the power converter.

The control unit has a 3-level operation mode of outputting AC voltage composed of 3-level voltages at a positive side and a negative side of the DC circuit unit and a voltage-division point of DC voltage between the positive side and the negative side of the DC circuit unit by performing ON/OFF control of the semiconductor elements, and a 2-level operation mode of outputting AC voltage composed of 2-level voltages at the positive side and the negative side of the DC circuit unit by performing ON/OFF control of the semiconductor elements.

The control unit executes first switchover control for switching between the 2-level operation mode and the 3-level operation mode, at a timing when, among the semiconductor elements, a set semiconductor element according to a polarity of a voltage command for controlling the power converter is continuing to be ON.

As described above, the control unit performs the first control for switching between the 3-level operation mode of outputting AC voltage composed of 3-level voltages at the positive side, the negative side, and the voltage-division point of the DC circuit unit, and the 2-level operation mode of outputting AC voltage composed of 2-level voltages at the positive side and the negative side of the DC circuit unit. In this way, the operation mode of the power converter can be switched to an optimum operation mode in accordance with the operation state, for example. For example, in a case of making output AC voltage close to a sinewave to reduce harmonic current and ripple current and reducing voltages applied to the switching elements to reduce switching loss, the 3-level operation mode is performed. Meanwhile, for example, in a case of reducing conduction loss of the semiconductor elements, the 2-level operation is performed. Thus, by having switchover control for switching between 2-level operation and 3-level operation, it is possible to perform high-efficiency power conversion utilizing the respective advantages of 2-level operation and 3-level operation.

Then, the control unit executes the first switchover control for switching between the 2-level operation mode and the 3-level operation mode, at a timing when the set semiconductor element is continuing to be ON in accordance with the polarity of the voltage command for controlling the power converter.

Thus, in accordance with the polarity of the voltage command, the first switchover control is performed in a state in which current is flowing through the set semiconductor element corresponding to the polarity, whereby it is possible to stably switch the operation mode while suppressing disturbance of current, variation in torque, and the like due to switchover between 2-level operation and 3-level operation.

In the power conversion device of the present embodiment configured as described above, the timing when the set semiconductor element is continuing to be ON is determined in accordance with the polarity of the voltage command for controlling the power converter.

As described above, the control unit determines the timing when the set semiconductor element is continuing to be ON, in accordance with the polarity of the voltage command.

Thus, since the timing when the set semiconductor element is continuing to be ON is determined in accordance with the polarity of the voltage command, it is possible to stably switch the operation mode while suppressing disturbance of current, variation in torque, and the like due to switchover between 2-level operation and 3-level operation.

In the power conversion device of the present embodiment configured as described above, the power converter includes a first arm for at least one phase of the AC circuit unit, the first arm being connected in parallel between the positive side and the negative side of the DC circuit unit and being formed by connecting a first semiconductor switch and a second semiconductor switch as the set semiconductor elements in series, and a second arm connected between an AC terminal which is a connection point of the first semiconductor switch and the second semiconductor switch, and the voltage-division point of the DC voltage between the positive side and the negative side of the DC circuit unit, the second arm having a bidirectional switch which is formed by the semiconductor element and interrupts or conducts currents that flow in both directions.

As described above, with the configuration including the first arm connected in parallel between the positive side and the negative side and capable of outputting positive-side voltage or negative-side voltage of the DC circuit unit, and the second arm connected to the voltage-division point of the DC circuit unit and capable of outputting intermediate voltage, the power conversion device 100 has a circuit configuration capable of switching between 2-level operation and 3-level operation.

In the power conversion device of the present embodiment configured as described above, the control unit performs the 3-level operation mode and the 2-level operation mode by performing ON/OFF control of the semiconductor elements through PWM based on the voltage command and a carrier signal, the control unit generates a basic signal at each of a first timing in the carrier signal when the first semiconductor switch is ON, within a phase region where the polarity of the voltage command is positive, and a second timing in the carrier signal when the second semiconductor switch is ON, within a phase region where the polarity of the voltage command is negative, and the control unit executes the first switchover control for switching between the 2-level operation mode and the 3-level operation mode, at a phase where, among a plurality of the basic signals that are generated, any basic signal is generated.

As described above, the control unit generates the basic signal at each of the first timing in the carrier signal when the first semiconductor switch which is the set semiconductor element is ON, within the phase region where the polarity of the output voltage command is positive, and the second timing in the carrier signal when the second semiconductor switch which is the set semiconductor element is ON, within the phase region where the polarity of the output voltage command is negative.

Then, the control device executes the first switchover control for switching between the 2-level operation mode and the 3-level operation mode, at a phase where, among the plurality of basic signals that are generated, any basic signal is generated.

Thus, the timing of performing the switchover control for switching between the 2-level operation mode and the 3-level operation mode is the first timing in the carrier signal when the first semiconductor switch is ON or the second timing in the carrier signal when the second semiconductor switch is ON.

Here, the second arm for outputting the intermediate potential at the voltage-division point of the DC circuit unit to the AC terminal is connected between the voltage-division point of the DC voltage and the AC terminal which is the connection point of the first semiconductor switch connected to the positive side of the DC circuit unit and the second semiconductor switch connected to the negative side of the DC circuit unit.

Therefore, in a state in which the first semiconductor switch or the second semiconductor switch is ON, current is flowing through the first semiconductor switch or the second semiconductor switch, and almost no current is flowing through the third semiconductor switch forming the second arm.

Thus, the first switchover control can be performed in a state in which current is not flowing through the third semiconductor switch forming the second arm, whereby it is possible to stably switch the operation mode while suppressing disturbance of current, variation in torque, and the like due to switchover between 2-level operation and 3-level operation.

In particular, in a driving electric motor of an electric vehicle or the like in which disturbance of current leads to variation in torque and thus causes a problem, stable operation can be performed by applying the power conversion device of the present embodiment.

In the present embodiment, the level judgment unit judges whether to set 2-level operation or 3-level operation as the operation mode of the power converter, on the basis of phase current for each AC phase detected as an element indicating the operation state of the power converter 20. Thus, the operation mode according to loss of the power converter is selected, whereby it is possible to stably switch between 2-level operation and 3-level operation while keeping a low-loss state.

In the power conversion device of the present embodiment configured as described above,
the bidirectional switch has diodes as the semiconductor elements and third semiconductor switches as the semiconductor elements, and
the bidirectional switch is configured such that the third semiconductor switches to which the diodes are connected in anti-parallel are connected in anti-series or series units each formed by connecting the diode and the third semiconductor switch in series are connected in anti-parallel.

With the bidirectional switch SWA of the second arm configured as described above, for example, the following is assumed. When the switching element SW1$p$U is ON in the 2-level operation mode, the first switchover control for switching to the 3-level operation mode is performed and the switching element SW3$x$U of the bidirectional switch SWA is turned on. Then, the switching element SW1$p$U is turned off and the switching element SW3$y$U of the bidirectional switch SWA is turned on, thus outputting an intermediate potential to the AC terminal Ac. At the time of turning on the switching element SW3$y$U, current is flowing through the diode connected in parallel to the switching element SW3$y$U. Therefore, disturbance of current due to the switching element SW3$xu$U being turned on does not occur.

Since the switching element SW3$x$U has already been switched to ON when the switching element SW1$p$U is ON, switching loss due to turning on/off of the switching element SW3$x$U does not occur. Thus, loss can be reduced also before and after switchover between the 2-level operation mode and the 3-level operation mode.

In the power conversion device of the present embodiment configured as described above,
one of a top-side peak phase or a bottom-side peak phase of the carrier signal is the first timing, and another thereof is the second timing.

As described above, the first timing and the second timing of performing the first switchover control are determined in synchronization with timings of the top-side or bottom-side peak phases of the carrier signal, whereby the first switchover control can be performed in a state in which the semiconductor switch connected to the positive side or the negative side of the DC circuit unit is assuredly ON. Thus, an effect of suppressing disturbance of current and variation in torque can be assuredly obtained.

In the power conversion device of the present embodiment configured as described above,
in a configuration having the first arms for a plurality of phases,
the first switchover control for each phase is executed at one of two peak phases consecutive in a time-axis direction in the carrier signal.

Thus, the first switchover control for each phase can be executed within a half cycle of the carrier signal, whereby it is possible to prevent such a phenomenon that the switchover timing for each phase is greatly shifted and operation becomes unstable. In particular, in a case where the power converter is performing high-speed operation, a time lag among the phases can be reduced and the operation can be stabilized.

Embodiment 2

Hereinafter, embodiment 2 of the present disclosure will be described focusing on difference from the above embodiment 1, with reference to the drawings. The same parts as in the above embodiment 1 are denoted by the same reference characters and the description thereof is omitted.

Figure 10:
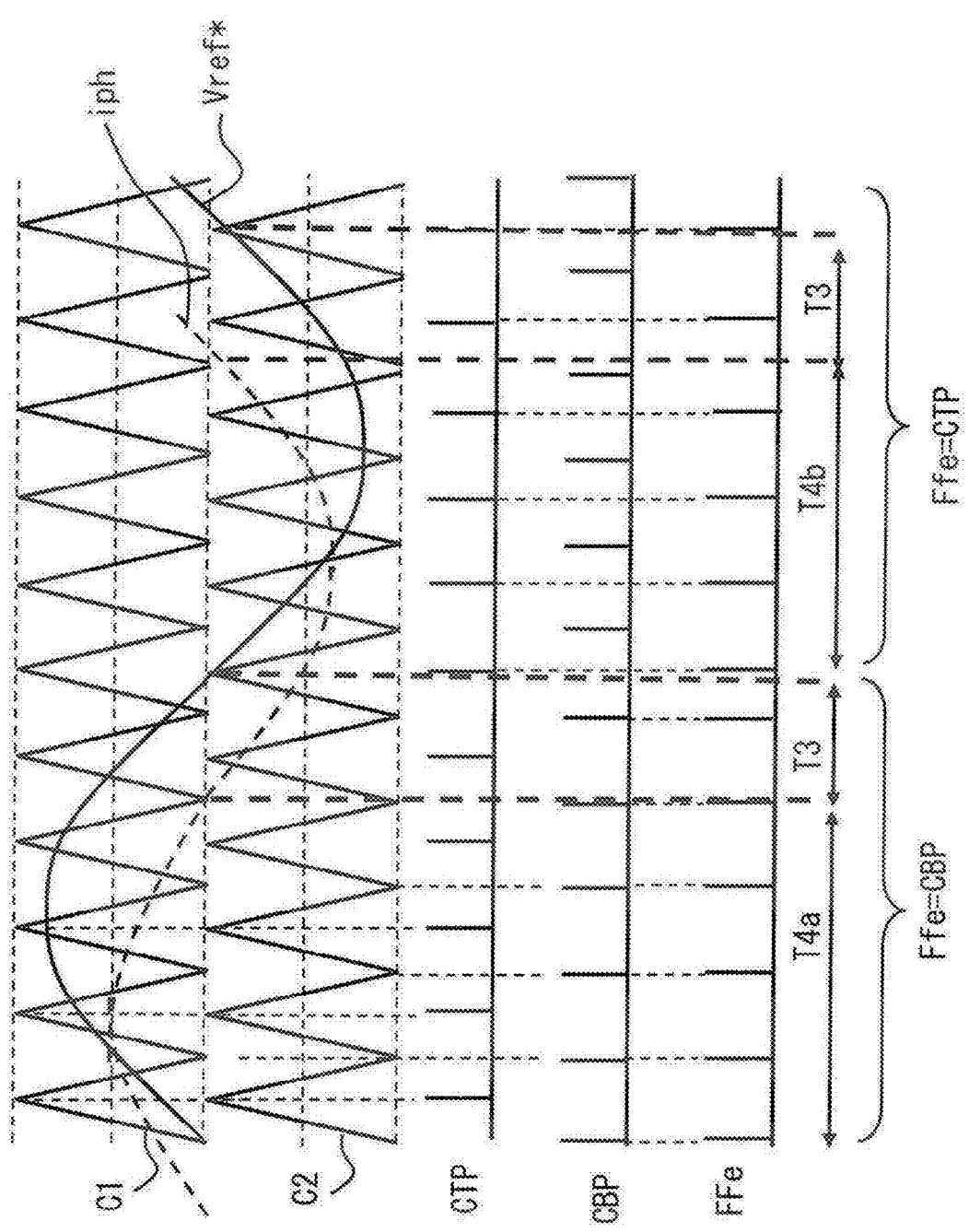
FIG. 10 is a block diagram showing a schematic configuration of a power conversion device according to embodiment 2.

FIG. 10 illustrates timings of performing the first switchover control during execution of the 3-level operation mode in the control device 50 of embodiment 2.

The power conversion device 100 detects each of phase currents iph flowing between the respective phases of the power converter 20 and the respective phases of the AC rotary machine 30, by a detector (not shown). The detected current iph is AC current. The power conversion device 100 according to the present embodiment is configured to determine the timing of executing the first switchover control for switching between 3-level operation and 2-level operation, considering the polarity of the detected phase current iph of the power converter 20.

As shown in FIG. 10, in a case where the power converter 20 performs operation with a power factor not being 1, there is a phase period T3 in which the polarity of the voltage command Vref* and the polarity of the phase current iph flowing in the phase corresponding to the polarity of the voltage command Vref* do not coincide with each other.

The control device 50 determines the FF enable signal FFe for executing the first switchover control, from among a plurality of FF enable signals FFe generated in phase ranges T4a, T4b in which the polarity of the voltage command Vref* and the polarity of the phase current iph flowing in the phase corresponding to the voltage command Vref coincide with each other.

That is, in the phase range T4a in which the polarities of the voltage command Vref* and the phase current iph are both positive, the control device 50 determines the FF enable signal FFe for executing the first switchover control, from among the FF enable signals FFe generated at the bottom-side peak phases of the carrier wave C. Then, the control device 50 executes the first switchover control at the phase of the determined FF enable signal FFe.

In the phase range T4b in which the polarities of the voltage command Vref* and the current iph for the same phase are both negative, the control device 50 determines the FF enable signal FFe for executing the first switchover control, from among the FF enable signals FFe generated at the top-side peak phases of the carrier wave C. Then, the control device 50 executes the first switchover control at the phase of the determined FF enable signal FFe.

Thus, with the configuration in which the first switchover control is not performed in the phase period T3 in which the polarity of the voltage command Vref* and the polarity of the phase current iph do not coincide with each other, the first switchover control can be performed in a state in which almost no current is flowing through the switching element SW3 forming the bidirectional switch SWA of the second arm 22 connected to the intermediate potential Vd/2.

For example, when the power factor deviates from 1, even if the polarity of the voltage command Vref is positive and the switching element SW1pU connected to the positive side of the DC circuit unit 10 is ON, negative current can flow in the reverse direction from the AC rotary machine 30 side toward the DC circuit unit 10 through the diode connected in anti-parallel to the switching element SW1pU.

In the state in which current is flowing through the parallel diode of the switching element SW1pU from the AC rotary machine 30 side as described above, it is assumed that the first switchover control for switching from 2-level operation to 3-level operation is performed. In this first switchover control, when the switching element SW1pU is turned off and the switching element Sw3yU is turned on, current from the AC rotary machine 30 flows through the switching element SW3yU to the voltage-division point 1m side (+Vd/2) instantaneously. Thus, the current flowing when the switching element SW3yU is turned on increases switching loss.

In the present embodiment, at the moment when the operation mode of the power converter 20 is switched and before and after that, control is performed so as to select a state in which current does not flow through the switching element SW3 forming the bidirectional switch SWA of the second arm 22, whereby switching loss is reduced.

In the power conversion device of the present embodiment configured as described above, the control unit determines the basic signal for executing the first switchover control, from among a plurality of the basic signals generated in a phase range where the polarity of the output voltage command and a polarity of current flowing in a phase corresponding to the output voltage command coincide with each other.

Thus, it is possible to stably switch the operation mode while suppressing disturbance of current, variation in torque, and the like at the time of switching the operation mode of the power converter between 2-level operation and 3-level operation.

Here, the three-phase AC has phase differences of 120 degrees among the phases, and therefore, in a state in which the power factor thus deviates from 1, in a case of performing, for the three phases, the first switchover control at the timing when the voltage command Vref and the phase current iph have the same polarity, it might be impossible to perform the first switchover control for all the three phases within a half cycle of the carrier wave C. In this case, in order to perform the first switchover control with as less a time lag as possible among the three phases, the first switchover control is performed with priorities set among the three phases. For example, at the timing when the first switchover control is performed for U phase having a high priority, switchover may be performed also for the other V phase and W phase.

Here, the timings of performing the first control for the other two phases having low priorities are not limited to the same timing as the timing of performing the first control for the phase having a high priority, and may be a timing within a period of a half cycle of the carrier wave C from the timing of performing the first control for the phase having a high priority.

Thus, the operation mode can be switched without occurrence of a time lag among the phases, whereby stable operation can be performed.

Embodiment 3

Hereinafter, embodiment 3 of the present disclosure will be described focusing on difference from the above embodiment 1, with reference to the drawings. The same parts as in the above embodiment 1 are denoted by the same reference characters and the description thereof is omitted.

The power conversion device 100 according to embodiment 3 is configured to perform a synchronous PWM mode in which the carrier frequency Fc is determined to be an integer multiple of a fundamental frequency while the phase of the carrier wave is synchronized with the phase of the voltage command Vref*. The fundamental frequency is the frequency of the voltage command Vref*. An asynchronous PWM mode is a mode in which the carrier frequency Fc is set at a constant frequency without being synchronized with the fundamental frequency. In the synchronous PWM mode, PWM control is performed with the carrier wave C set to have a number N of pulses equal to a multiple of 3, such as 3, 6, 9, per one cycle of the fundamental wave.

In the present embodiment, second switchover control in which the asynchronous PWM mode is performed when the fundamental frequency is low, and the synchronous PWM mode is performed when the fundamental frequency is high, is executed.

In addition, the power conversion device 100 according to the present embodiment 3 performs third switchover control for switching between a first pulse number modulation mode in which PWM is performed using a set first pulse number N1 as the number of pulses of the carrier wave C per one cycle of the voltage command Vref* and a second pulse number modulation mode in which PWM is performed using a set second pulse number N2 as the number of pulses of the carrier wave C per one cycle of the voltage command Vref*.

Here, the power conversion device 100 according to the present embodiment 3 performs the second switchover control or the third switchover control at the same time as execution of the first switchover control for switching the operation mode of the power converter 20 between 2-level operation and 3-level operation as described in embodiments 1 and 2.

First, a case where the control device 50 performs the third switchover control for switching the number N of pulses of the carrier wave C at the same time as execution of the first switchover control, will be described.

Figure 11:
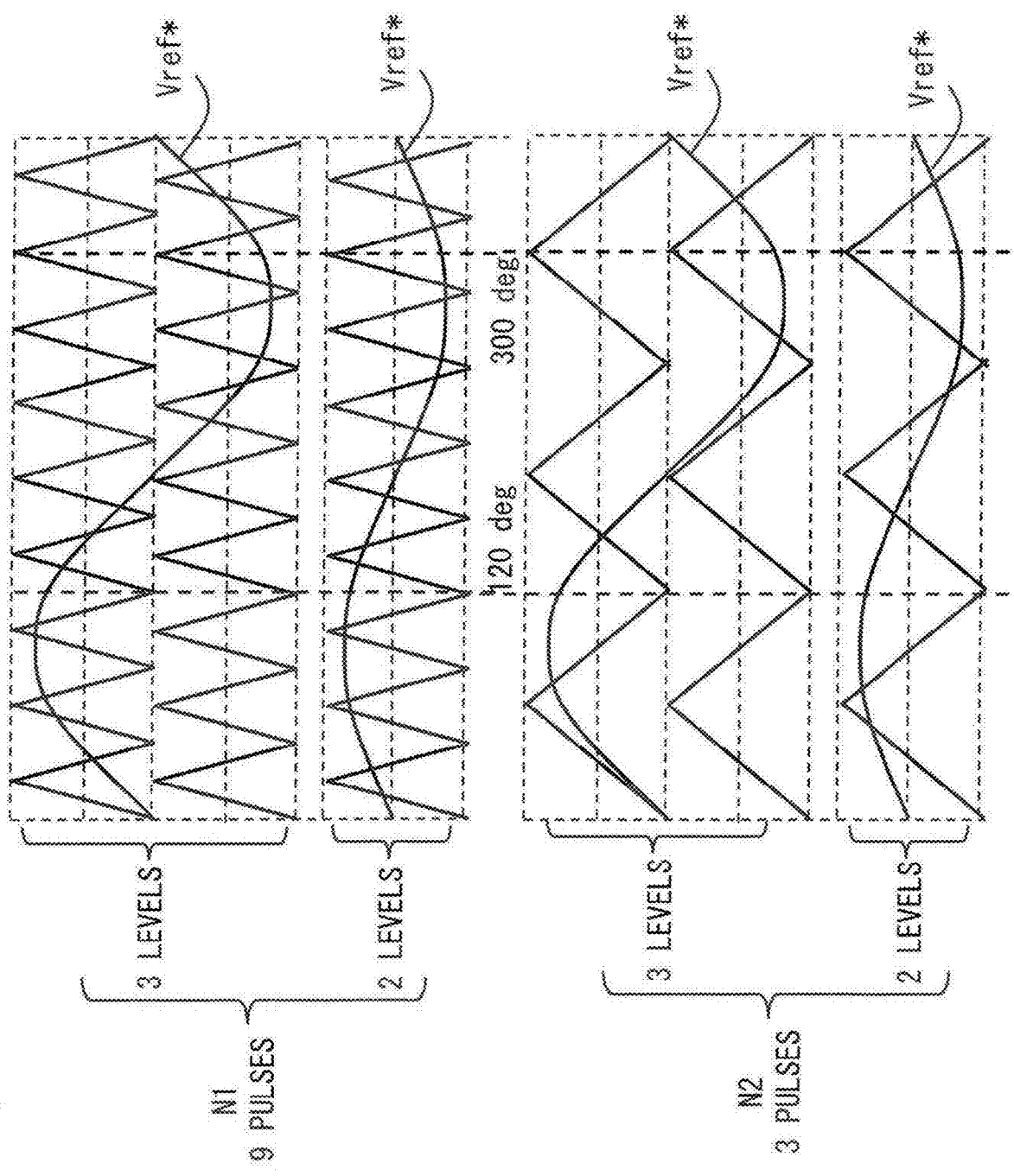
FIG. 11 shows timings of performing second switchover control in a power conversion device according to embodiment 3.

FIG. 11 shows the phase relationship between the carrier wave C and the voltage command Vref* in each of a case of performing the first pulse modulation mode using the set first pulse number N1 (9 pulses) as the number of pulses of the carrier wave C and a case of performing the second pulse modulation mode using the set second pulse number N2 (3 pulses) as the number of pulses of the carrier wave C, in the synchronous PWM mode of the power conversion device 100 according to embodiment 3.

In the synchronous PWM mode, a timing of switching the number of pulses of the carrier wave C per one cycle of the voltage command Vref* from the set first pulse number, i.e., 3 pulses, to the set second pulse number, i.e., 9 pulses, is determined by the phase of the carrier wave C. For example, among the timings in the phase relationship shown in FIG. 11, at a phase of 120 degrees, the bottom timings of the carrier waves C of 3 pulses and 9 pulses coincide with each other, i.e., have the same phase. In addition, at a phase of 300 degrees, the top timings of the carrier waves C of 3 pulses and 9 pulses coincide with each other, i.e., have the same phase.

Thus, the control device 50 executes the first switchover control for switching between the 2-level operation mode and the 3-level operation mode, on the basis of the FF enable signal FFe generated at a phase of 120 degrees or 300 degrees among a plurality of the FF enable signals FFe that are generated.

Then, at the same time as execution of the first switchover control, the control device 50 executes the third switchover control for switching from the first pulse number modulation mode in which PWM is performed with 3 pulses to the second pulse number modulation mode in which PWM is performed with 9 pulses. For example, at a phase of 120 degrees shown in FIG. 11, the control device 50 performs switchover from a 3-level 9-pulse operation mode to a 2-level 3-pulse operation mode.

In this way, in a case of also switching the number N of pulses of the carrier wave C in the synchronous PWM mode at the same time as switchover between 2-level operation and 3-level operation, switchover is performed at the above-described timing, whereby it is possible to stably perform mode switchover without causing disturbance of current, increase in switching loss, and the like.

Figure 12:
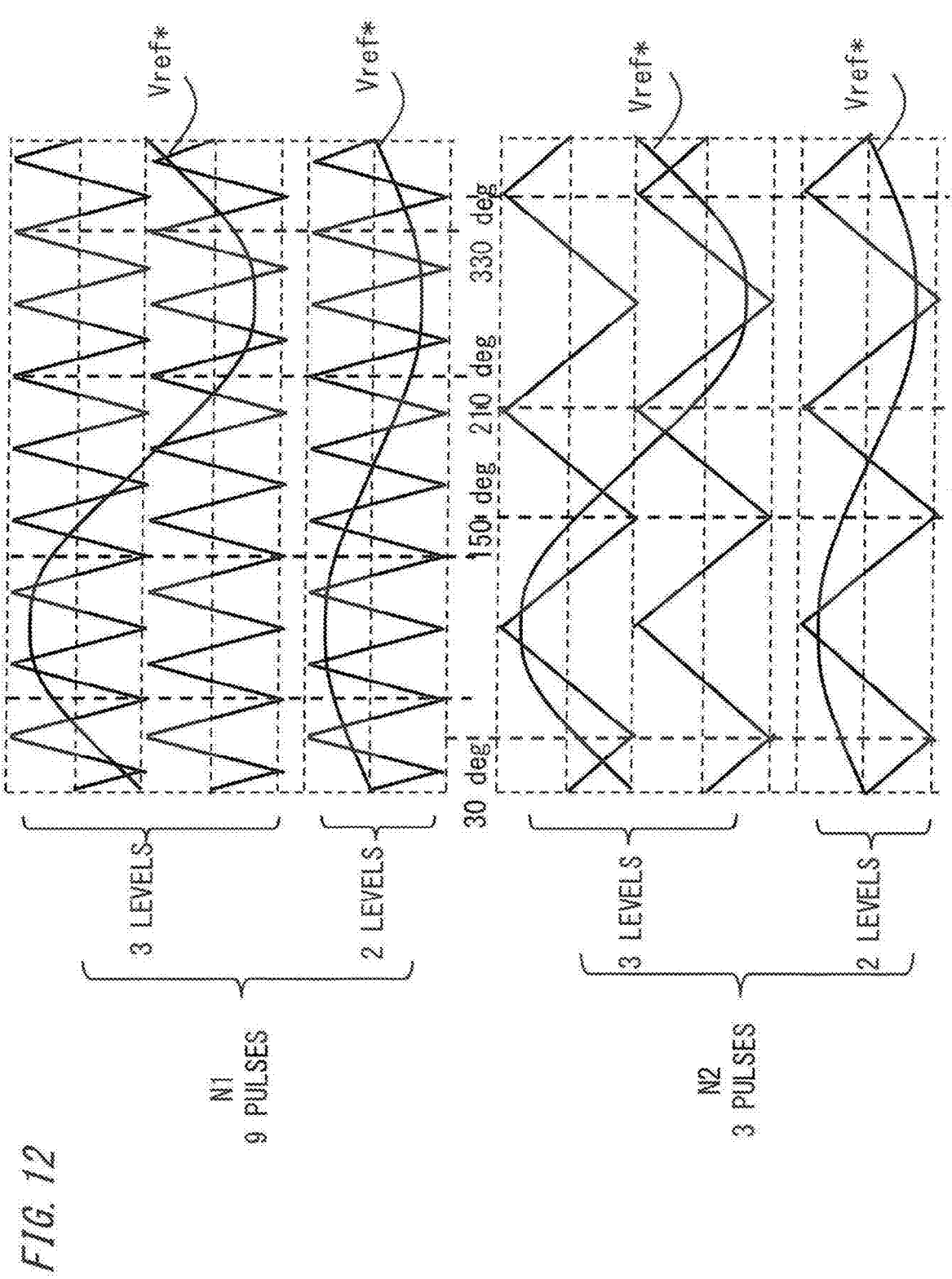
FIG. 12 shows timings of performing second switchover control in the power conversion device according to embodiment 3.

FIG. 12 shows the phase relationship between the carrier wave C and the voltage command Vref* in each of a case of performing the first pulse modulation mode using 9 pulses as the number of pulses of the carrier wave C and a case of performing the second pulse modulation mode using 3 pulses as the number of pulses of the carrier wave C, in the synchronous PWM mode of the power conversion device 100 according to embodiment 3.

In FIG. 12, the phase relationship of the carrier wave C relative to the voltage command Vref* is different as compared to FIG. 11.

In the phase relationship shown in FIG. 12, between the first pulse modulation mode with 9 pulses and the second modulation mode with 3 pulses, the top and bottom timings of the carrier waves C are not at the same phase, but at timings of phases of 30, 150, 210, and 300 degrees, the current states and the like are close to each other between the first pulse modulation mode with 9 pulses and the second modulation mode with 3 pulses. That the current states are close to each other means that the ON/OFF states of the switching element SW1 connected to the positive side of the DC circuit unit 10 and the switching element SW2 connected to the negative side of the DC circuit unit 10 are the same between the first pulse modulation mode with 9 pulses and the modulation mode with 3 pulses.

Thus, the control device 50 performs the third switchover control for switching the number N of pulses of the carrier wave C at the same time as execution of the first switchover control, at the phase of the FF enable signal FFe generated at the phase of the first timing in the carrier signal when the switching element SW1 is ON or the phase of the second timing when the switching element SW2 is ON in both of the first pulse number modulation mode and the second pulse number modulation mode, among the FF enable signals FFe generated in the first pulse modulation mode with 9 pulses and the modulation mode with 3 pulses.

Thus, it becomes possible to stably switch the operation mode without causing disturbance of current and variation in torque.

Here, in the phase relationship shown in FIG. 12, for example, in such a case where the amplitude of the voltage command Vref* is small, at timings of phases of 30, 150, 210, and 300 degrees, the ON/OFF states of the switching element SW1 connected to the positive side of the DC circuit unit 10 and the switching element SW2 connected to the negative side of the DC circuit unit 10 can be different between the first pulse modulation mode with 9 pulses and the second modulation mode with 3 pulses. The control device 50 of the present embodiment selects the FF enable signal FFe at which the switching states of the switching elements SW1, SW2 are the same in both of the first pulse number modulation mode and the second pulse number modulation mode, among the plurality of FF enable signals FFe, as described above. Thus, irrespective of the magnitude of the amplitude of the voltage command Vref*, it is possible to stably switch the operation mode while suppressing current state difference between both modes before and after switchover.

Figure 13:
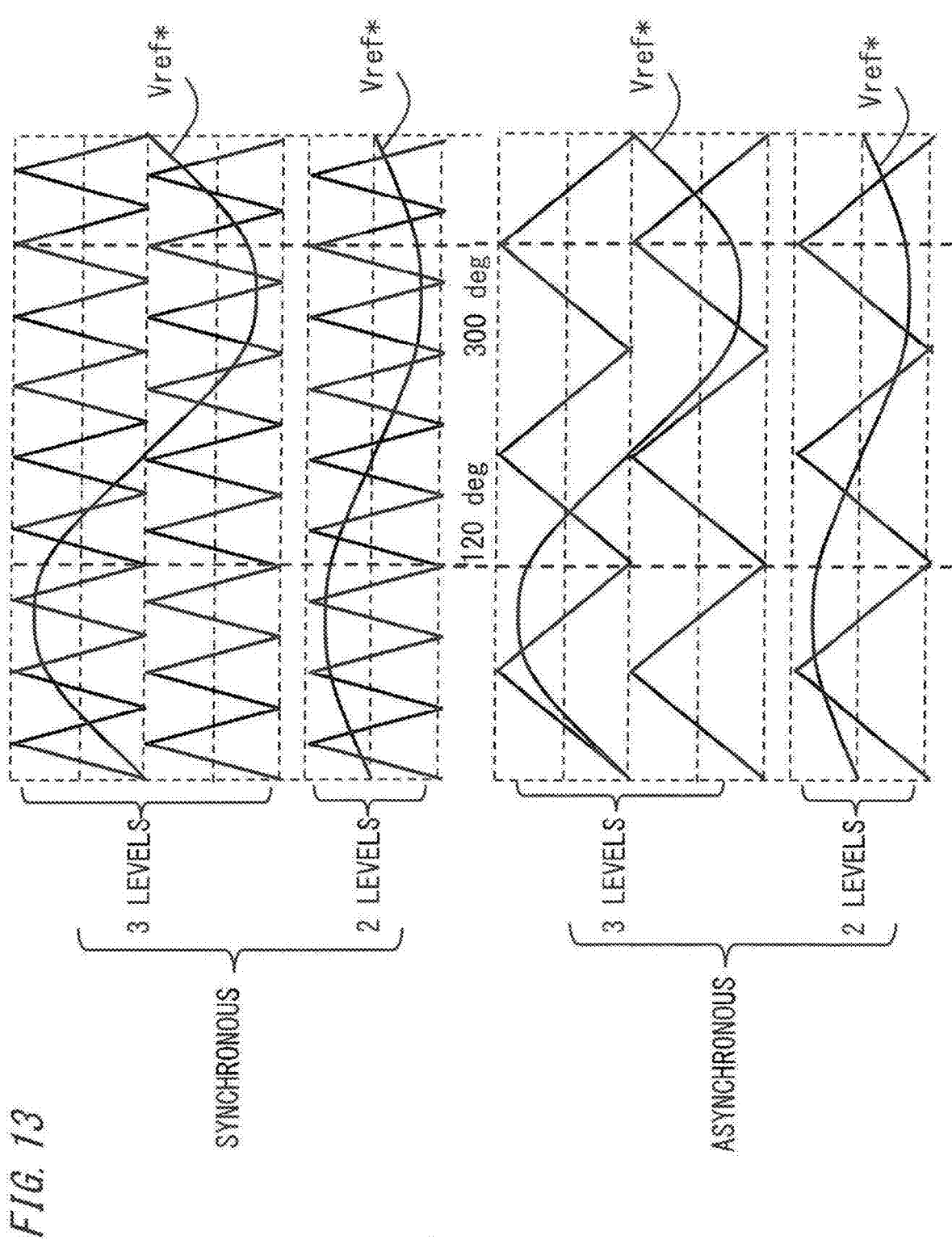
FIG. 13 shows timings of performing third switchover control in the power conversion device according to embodiment 3.

FIG. 13 shows the phase relationship between the carrier wave C and the voltage command Vref* in each of a case of performing the synchronous PWM mode and a case of performing the asynchronous PWM mode, in the power conversion device 100 according to embodiment 1.

Here, in the asynchronous PWM mode, the phase of the carrier wave C is not controlled, and therefore the phase of the carrier wave C relative to the voltage command Vref* differs depending on the operation condition. Therefore, as shown in FIG. 13, the control device 50 performs the first switchover control, and the second switchover control for switching between the synchronous PWM mode and the asynchronous PWM mode, at the same time, at a phase of the moment when the ON/OFF states of the switching element SW1 connected to the positive side of the DC circuit unit 10 and the switching element SW2 connected to the negative side of the DC circuit unit 10 become the same between the synchronous PWM mode and the asynchronous PWM mode.

Thus, it becomes possible to stably switch the operation mode without causing disturbance of current and variation in torque.

In the power conversion device of the present embodiment configured as described above, the control unit performs third switchover control for switching between a first pulse number modulation mode in which PWM is performed using a set first pulse number as a number of pulses of the carrier signal per one cycle of the output voltage command and a second pulse number modulation mode in which PWM is performed using a set second pulse number as the number of pulses of the carrier signal per one cycle of the output voltage command, at the same time as execution of the first switchover control.

As described above, also in the power conversion device of the present embodiment, the same effects as in embodiments 1 and 2 are provided, so that it is possible to stably switch the operation mode while suppressing disturbance of current, variation in torque, and the like due to switchover between 2-level operation and 3-level operation.

Further, with the configuration in which the third switchover control for switching between the first pulse number modulation mode in which PWM is performed using the first pulse number and the second pulse number modulation mode in which PWM is performed using the second pulse number, is performed at the same time as the first switchover control, it becomes possible to perform suppression control for output voltage error according to the frequency of the voltage command while suppressing disturbance of current, variation in torque, and the like due to switchover of the operation mode.

In the power conversion device of the present embodiment configured as described above, the basic signal with which the first switchover control and the third switchover control are performed at the same time is, among a plurality of the basic signals generated in the first pulse number modulation mode and the second pulse number modulation mode, the basic signal generated at a phase of the first timing in the carrier signal when the first semiconductor switch is ON in both of the first pulse number modulation mode and the second pulse number modulation mode or a phase of the second timing in the carrier signal when the second semiconductor switch is ON in both of the first pulse number modulation mode and the second pulse number modulation mode.

As described above, the FF enable signal which is the basic signal for specifying the phase at which the first switchover control and the third switchover control are performed at the same time, is generated at the phase of the first timing in the carrier signal when the first semiconductor switch is ON or the phase of the second timing when the second semiconductor switch is ON in both of the first pulse number modulation mode and the second pulse number modulation mode. Thus, it becomes possible to switch the operation mode in a state in which the current states are similar in the operation modes before and after switchover, whereby disturbance of current, variation in torque, and the like due to switchover of the operation mode can be further suppressed and the operation mode can be stably switched.

In the power conversion device of the present embodiment configured as described above, the control unit performs second switchover control for switching between an asynchronous PWM mode in which modulation is performed with the carrier signal having a constant frequency asynchronous with a frequency of the output voltage command and a synchronous PWM mode in which modulation is performed with the carrier signal having a frequency synchronous with the frequency of the output voltage command, at the same time as execution of the first switchover control.

Thus, the same effects as in embodiments 1 and 2 are provided, so that it is possible to stably switch the operation mode while suppressing disturbance of current, variation in torque, and the like due to switchover between 2-level operation and 3-level operation.

Further, with the configuration in which the second switchover control for switching between the asynchronous PWM mode and the synchronous PWM mode is performed at the same time as execution of the first switchover control, it becomes possible to perform suppression control for output voltage error according to the frequency of the voltage command while suppressing disturbance of current, variation in torque, and the like due to switchover of the operation mode.

In the power conversion device of the present embodiment configured as described above, the basic signal with which the first switchover control and the second switchover control are performed at the same time is, among a plurality of the basic signals generated in the asynchronous PWM mode and the synchronous PWM mode, the basic signal generated at a phase of the first timing in the carrier signal when the first semiconductor switch is ON in both of the asynchronous PWM mode and the synchronous PWM mode or a phase of the second timing in the carrier signal when the second semiconductor switch is ON in both of the asynchronous PWM mode and the synchronous PWM mode.

As described above, the FF enable signal which is the basic signal for specifying the phase at which the first switchover control and the second switchover control are performed at the same time is generated at the phase of the first timing in the carrier signal when the first semiconductor switch is ON or the phase of the second timing when the second semiconductor switch is ON in both of the synchronous PWM mode and the asynchronous PWM mode.

Thus, it becomes possible to switch the operation mode in a state in which the current states are similar in the operation modes before and after switchover, whereby disturbance of current, variation in torque, and the like due to switchover of the operation mode can be further suppressed and the operation mode can be stably switched.

In addition, even in a case where the ON/OFF states of the first and second semiconductor switches are different between the operation modes depending on the magnitude of the amplitude of the voltage command Vref* and the phase state of the carrier wave C, the first switchover control and the second switchover control are executed at the phase when the current states become similar. In this way, during operation of the power converter, it is possible to determine the timing of switching the operation mode while observing the phase for stably switching the operation mode.

Figure 14:
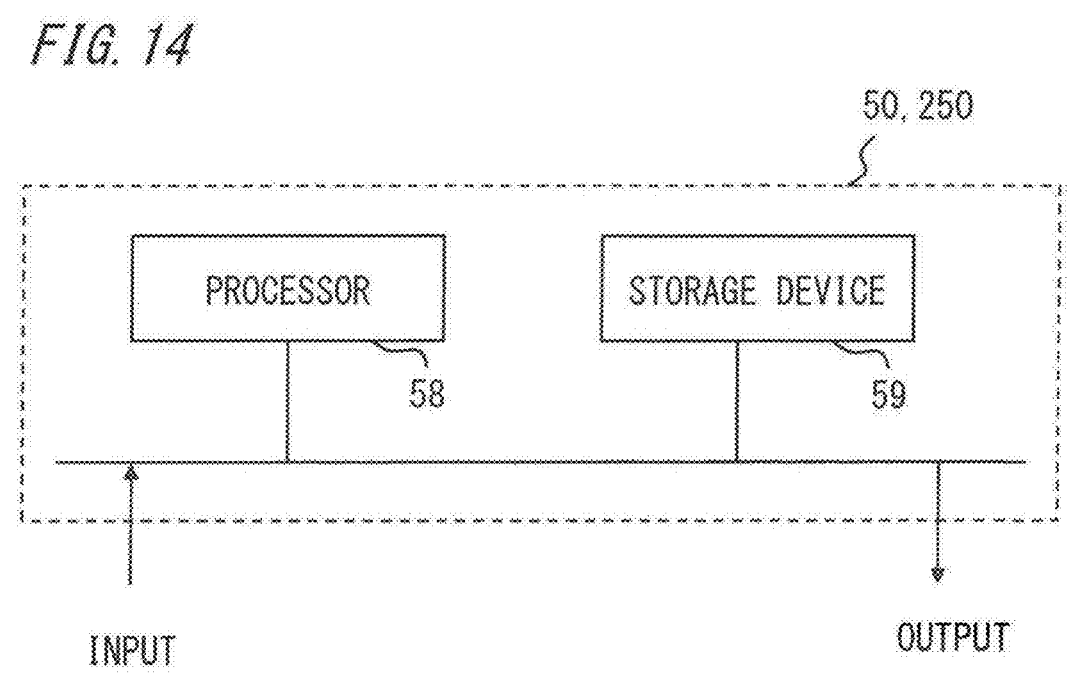

FIG. 14 shows an example of hardware of the control device 50, 250 described in embodiments 1 and 2.

The control device 50, 250 described in embodiments 1 and 2 includes a processor 58 and a storage device 59, as shown in the hardware example in FIG. 14. The storage device 59 is provided with a volatile storage device such as a random access memory and a nonvolatile auxiliary storage device such as a flash memory (not shown).

Instead of the flash memory, an auxiliary storage device of a hard disk may be provided. The processor 58 executes a program inputted from the storage device 59. In this case, the program is inputted from the auxiliary storage device to the processor 58 via the volatile storage device. The processor 58 may output data such as a calculation result to the volatile storage device of the storage device 59, or may store such data into the auxiliary storage device via the volatile storage device.

As described above, it is also possible to perform control of the power converter by software processing, whereby the control can be implemented at low cost.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

SW switching element (semiconductor element)

SW1, SW1$p$U, SW1$p$V, SW1$p$W switching element (first switching element)

SW2, SW2$n$U, SW2$n$V, SW2$n$W switching element (second switching element)

SW3, SW3$x$U, SW3$y$U, SW3$x$V, SW3$y$V, SW3$x$W, SW3$y$W switching element (third switching element)

DxU, DyU, DxV, DyV, DxW, DyW diode (semiconductor element)

SWA bidirectional switch

10 DC circuit unit

21 first arm

22 second arm

30 AC rotary machine (AC circuit unit)

50 control device (control unit)

100, 100$e$ power conversion device

The invention claimed is:

1. A power conversion device comprising:

a power converter which has semiconductor elements and converts DC power from a DC circuit to AC power for an AC circuit; and a controlling circuitry which controls the power converter, wherein the controlling circuitry has a 3-level operation mode of outputting AC voltage composed of 3-level voltages at a positive side and a negative side of the DC circuit and a voltage-division point of DC voltage between the positive side and the negative side of the DC circuit by performing ON/OFF control of the semiconductor elements, and a 2-level operation mode of outputting AC voltage composed of 2-level voltages at the positive side and the negative side of the DC circuit by performing ON/OFF control of the semiconductor elements, and the controlling circuitry executes first switchover control for switching between the 2-level operation mode and the 3-level operation mode, at a timing when, among the semiconductor elements, a set semiconductor element according to a polarity of a voltage command for controlling the power converter is continuing to be ON.

2. The power conversion device according to claim 1, wherein the timing when the set semiconductor element is continuing to be ON is determined in accordance with the polarity of the voltage command for controlling the power converter.

3. The power conversion device according to claim 2, wherein the power converter includes a first arm for at least one phase of the AC circuit, the first arm being connected in parallel between the positive side and the negative side of the DC circuit and being formed by connecting a first semiconductor switch and a second semiconductor switch as the set semiconductor elements in series, and a second arm connected between an AC terminal which is a connection point of the first semiconductor switch and the second semiconductor switch, and the voltage-division point of the DC voltage between the positive side and the negative side of the DC circuit, the second arm having a bidirectional switch which is formed by the semiconductor element and interrupts or conducts currents that flow in both directions.

4. The power conversion device according to claim 3, wherein the controlling circuitry performs the 3-level operation mode and the 2-level operation mode by performing ON/OFF control of the semiconductor elements through PWM based on the voltage command and a carrier signal, the controlling circuitry generates a basic signal at each of a first timing in the carrier signal when the first semiconductor switch is ON, within a phase region where the polarity of the voltage command is positive, and a second timing in the carrier signal when the second semiconductor switch is ON, within a phase region where the polarity of the voltage command is negative, and the controlling circuitry executes the first switchover control for switching between the 2-level operation mode and the 3-level operation mode, at a phase where, among a plurality of the basic signals that are generated, any basic signal is generated.

5. The power conversion device according to claim 4, wherein one of a top-side peak phase or a bottom-side peak phase of the carrier signal is the first timing, and another thereof is the second timing.

6. The power conversion device according to claim 5, wherein the bidirectional switch has diodes as the semiconductor elements and third semiconductor switches as the semiconductor elements, and the bidirectional switch is configured such that the third semiconductor switches to which the diodes are connected in anti-parallel are connected in anti-series or series each formed by connecting the diode and the third semiconductor switch in series are connected in anti-parallel.

7. The power conversion device according to claim 4, wherein the bidirectional switch has diodes as the semiconductor elements and third semiconductor switches as the semiconductor elements, and the bidirectional switch is configured such that the third semiconductor switches to which the diodes are connected in anti-parallel are connected in anti-series or series each formed by connecting the diode and the third semiconductor switch in series are connected in anti-parallel.

8. The power conversion device according to claim 1, wherein the power converter includes a first arm for at least one phase of the AC circuit, the first arm being connected in parallel between the positive side and the negative side of the DC circuit and being formed by connecting a first semiconductor switch and a second semiconductor switch as the set semiconductor elements in series, and a second arm connected between an AC terminal which is a connection point of the first semiconductor switch and the second semiconductor switch, and the voltage-division point of the DC voltage between the positive side and the negative side of the DC circuit, the second arm having a bidirectional switch which is formed by the semiconductor element and interrupts or conducts currents that flow in both directions.

9. The power conversion device according to claim 8, wherein the controlling circuitry performs the 3-level operation mode and the 2-level operation mode by performing ON/OFF control of the semiconductor elements through PWM based on the voltage command and a carrier signal, the controlling circuitry generates a basic signal at each of a first timing in the carrier signal when the first semiconductor switch is ON, within a phase region where the polarity of the voltage command is positive, and a second timing in the carrier signal when the second semiconductor switch is ON, within a phase region where the polarity of the voltage command is negative, and the controlling circuitry executes the first switchover control for switching between the 2-level operation mode and the 3-level operation mode, at a phase where, among a plurality of the basic signals that are generated, any basic signal is generated.

10. The power conversion device according to claim 9, wherein one of a top-side peak phase or a bottom-side peak phase of the carrier signal is the first timing, and another thereof is the second timing.

11. The power conversion device according to claim 10, wherein the bidirectional switch has diodes as the semiconductor elements and third semiconductor switches as the semiconductor elements, and the bidirectional switch is configured such that the third semiconductor switches to which the diodes are connected in anti-parallel are connected in anti-series or series each formed by connecting the diode and the third semiconductor switch in series are connected in anti-parallel.

12. The power conversion device according to claim 10, wherein in a configuration having the first arms for a plurality of phases, the first switchover control for each phase is executed at one of two peak phases consecutive in a time-axis direction in the carrier signal.

13. The power conversion device according to claim 9, wherein the bidirectional switch has diodes as the semiconductor elements and third semiconductor switches as the semiconductor elements, and the bidirectional switch is configured such that the third semiconductor switches to which the diodes are connected in anti-parallel are connected in anti-series or series each formed by connecting the diode and the third semiconductor switch in series are connected in anti-parallel.

14. The power conversion device according to claim 13, wherein in a configuration having the first arms for a plurality of phases, the first switchover control for each phase is executed at one of two peak phases consecutive in a time-axis direction in the carrier signal.

15. The power conversion device according to claim 9, wherein in a configuration having the first arms for a plurality of phases, the first switchover control for each phase is executed at one of two peak phases consecutive in a time-axis direction in the carrier signal.

16. The power conversion device according to claim 9, wherein the controlling circuitry determines the basic signal for executing the first switchover control, from among a plurality of the basic signals generated in a phase range where the polarity of the voltage command and a polarity of current flowing in a phase corresponding to the voltage command coincide with each other.

17. The power conversion device according to claim 9, wherein the controlling circuitry performs second switchover control for switching between an asynchronous PWM mode in which modulation is performed with the carrier signal having a constant frequency asynchronous with a frequency of the voltage command and a synchronous PWM mode in which modulation is performed with the carrier signal having a frequency synchronous with the frequency of the voltage command, at the same time as execution of the first switchover control.

18. The power conversion device according to claim 17, wherein the basic signal with which the first switchover control and the second switchover control are performed at the same time is, among a plurality of the basic signals generated in the asynchronous PWM mode and the synchronous PWM mode, the basic signal generated at a phase of the first timing in the carrier signal when the first semiconductor switch is ON in both of the asynchronous PWM mode and the synchronous PWM mode or a phase of the second timing in the carrier signal when the second semiconductor switch is ON in both of the asynchronous PWM mode and the synchronous PWM mode.

19. The power conversion device according to claim 9, wherein the controlling circuitry performs third switchover control for switching between a first pulse number modulation mode in which PWM is performed using a set first pulse number as a number of pulses of the carrier signal per one cycle of the voltage command and a second pulse number modulation mode in which PWM is performed using a set second pulse number as the number of pulses of the carrier signal per one cycle of the voltage command, at the same time as execution of the first switchover control.

20. The power conversion device according to claim 19, wherein the basic signal with which the first switchover control and the third switchover control are performed at the same time is, among a plurality of the basic signals generated in the first pulse number modulation mode and the second pulse number modulation mode, the basic signal generated at a phase of the first timing in the carrier signal when the first semiconductor switch is ON in both of the first pulse number modulation mode and the second pulse number modulation mode or a phase of the second timing in the carrier signal when the second semiconductor switch is ON in both of the first pulse number modulation mode and the second pulse number modulation mode.

\* \* \* \* \*